United States Patent
Tsujimoto et al.

(10) Patent No.: US 7,291,660 B2
(45) Date of Patent: Nov. 6, 2007

(54) METHOD OF PRODUCING HIGH CONCENTRATION POLYMER SOLUTION

(75) Inventors: Tadahiro Tsujimoto, Kanagawa (JP); Yukihiro Katai, Kanagawa (JP); Misao Takahashi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 457 days.

(21) Appl. No.: 10/634,846

(22) Filed: Aug. 6, 2003

(65) Prior Publication Data

US 2004/0030006 A1  Feb. 12, 2004

(30) Foreign Application Priority Data

Aug. 7, 2002 (JP) ............................. 2002-230363

(51) Int. Cl.
*C08G 18/08* (2006.01)
(52) U.S. Cl. ...................................... 523/343; 159/47.1
(58) Field of Classification Search ................... 159/23, 159/24.1, 24.2, 26.1, 27.1, 28.1, 29, 30, 31; 523/342
See application file for complete search history.

(56) References Cited

U.S. PATENT DOCUMENTS 4,406,750 A * 9/1983 Irvin ........................... 203/22

FOREIGN PATENT DOCUMENTS

| JP | 04-259511(A) | 9/1992 |
| JP | 2002-103357 (A) | 4/2002 |

* cited by examiner

*Primary Examiner*—Edward J. Cain
(74) *Attorney, Agent, or Firm*—Sughrue Mion Pllc.

(57) ABSTRACT

TAC and additives are mixed in a mixture solvent of dichloromethane, methanol and n-butanol to obtain a dispersion solution. The dispersion solution is heated to become a low concentration dope whose concentration is 19.3 wt. %. The low concentration dope is fed with a pump, and supplied through a flash nozzle to a concentrating apparatus to performing flash evaporation of the solvent in the concentrating apparatus. Thus part of the solvent in the low concentration dope evaporates to obtain a condensed dope. The part of the solvent is condensed on a condensation surface to obtain a condensed solvent. The condensed solvent flows through a pipe out of the concentrating apparatus. The high concentration dope has a solid content of 22.3 wt. %, and drawn through a pump. As the solid content of the high concentration dope is high, a polymer film having the self-supporting property can be easily formed of the high concentration dope in a film production line.

31 Claims, 6 Drawing Sheets

METHOD OF PRODUCING HIGH CONCENTRATION POLYMER SOLUTION

BACKGROUND OF THE INVENTION

1. Field of the Invention

The present invention relates to a method of producing a high concentration polymer solution, and particularly to a method of producing a high concentration polymer solution that is used for forming a cellulose acylate film.

2. Description Related to the Prior Art

As a method for producing a polymer film, there are a melt extrusion method and a solution casting method. In the solution casting method, the polymer solution in which a polymer is dissolved in a solvent is cast from a casting die on a belt or a rotating drum or a belt. The polymer solution is thereafter dried to become a polymer film, and the polymer film is peeled from the belt or the drum.

When the polymer film is formed from the polymer solution in the solution casting method, the polymer film is more excellent in the physical property and optical property than the melt extrusion method. Therefore, the latter method is preferable for forming a film base used for a photo film. Further, the polymer film formed in the solution casting method is more excellent in optical isotropy and constant thickness and has smaller amount of dusts than in the melt extrusion method. The polymer film whose polymer is cellulose acylate, especially cellulose triacetate (hereinafter TAC) is used for optoelectronic products, such as a protective film for a polarizing filter, an optical retardation film, transparent conductive film, antireflection film with antiglare property and the like.

In order to effectively produce the polymer film in the solution casting method, the concentration of the polymer in the polymer solution (or dope) is preferably high. When the concentration is low, the large amount of solvent is necessary for preparing the polymer solution, and the time for drying the polymer solution on the belt or the drum is long, which causes the low productivity. Further, a gas (or vapor) of the solvent that is generated in drying the solution is liquidized for recovery and reuse. The costs therefor depend on the time from casting to peeling, and accordingly, becomes higher when the concentration of the polymer becomes smaller.

Accordingly, it is preferable to prepare a high concentration polymer solution having high concentration for forming the polymer film in the solution casting method. However, there are some problems for preparing the high concentration polymer solution. For example, when the polymer powders are dissolved in the solvent, then undissolved clumps of the polymer powders are generated, which prevents the uniform dissolution. In order to dissolve the polymer uniformly, a high speed stirring machine and an inline dispersing machine are used as described in the Japanese Patent Laid-Open Publication No. 2001-340735. Further, the Japanese Patent Laid-Open Publications No. 2000-256468 and 2001-206981 propose methods for dissolving the polymer powder under high pressure and high temperature to improve the solubility and shorten the dissolving time and for dissolving the polymer powder under supercritical state. Further, the polymer may be dispersed and swollen and the temperature may become lower, to dissolve the polymer in the solvent effectively. However, when the concentration of the polymer solution becomes higher, the solubility becomes lower in any methods. The solubility in this dissolving method for dissolving a large amount of polymer depends on the concentration of the polymer solution.

Accordingly, a concentrating method is proposed, in which a low concentration polymer solution is concentrated to the high concentration polymer solution. In the concentrating method, as described in Japanese Patent Laid-Open Publication No. 4-259511, a thin film is formed of the polymer solution with rotating of rotating blades, and the polymer solution is evaporated such that the evaporated gas may be condensed to reuse the condensed solvent and the concentration of the polymer solution may become higher. Furthermore, the Japanese Patent Laid-Open Publication No. 2002-103357 discloses a splash concentration method, or a method in which the polymer solution having high temperature and high pressure is splashed to make evaporation of the solvent. The evaporated gas is separated from the polymer solution and the concentration of the polymer solution becomes higher in the flash concentrating method. The flash point method in the publication No. 2002-103357, as the structure of equipment is simple, has more merits in cost of equipment and running cost than the former method in the publication No. H4-259511.

However, in the flash concentration method of the prior art, as the polymer solution is splashed in a gas phase in the flash tank, part thereof is adhered on an inner surface of a flash tank. The inner surface of the flash tank is heated to supply the heat energy for the polymer solution. Accordingly, the skinning of gel-like material is often formed on the inner surface of the flash tank, and mixed into a condensed polymer solution, which makes the quality of the polymer film lower.

SUMMARY OF THE INVENTION

An object of the present invention is to provide a method of producing a high concentration polymer solution adequate for forming a polymer film.

Another object of the present invention is to provide a method of producing a high concentration polymer solution, in which the polymer solution is continuously concentrated, and the concentration of the high concentration polymer solution fluctuates in a predetermined range.

Still another object of the present invention is to provide a method of producing a high concentration polymer solution, in which flash evaporation is performed without the generation of the skinning and the gel-like material.

In order to achieve the object and the other object, in a method of producing a high concentration polymer solution, a polymer is dissolved into a solvent to prepare a low concentration polymer solution. The low concentration polymer solution is continuously concentrated to obtain the high concentration polymer solution. The low concentration polymer solution or the high concentration polymer solution is filtrated to remove solid impurities of the polymer solution. In the concentrating of the low concentration polymer solution, part of the solvent is obtained and reused for dissolving the polymer.

In the present invention, the higher polymer concentration of the high concentration polymer solution is in the range of 1 wt. % to 20 wt. % higher than a lower polymer concentration of the low concentration polymer solution. Otherwise, when $C_H$ is determined as a predetermined value of the polymer concentration of said high concentration polymer solution, and $C_L$ is the polymer concentration of said low concentration polymer solution, then the fluctuation of the polymer concentration of said high concentration polymer solution is preserved in a range of $\pm(C_H-C_L)\times 10$ wt. % from the predetermined value $C_H$.

Further, in the present invention, the low concentration polymer solution is continuously fed in a concentrating tank, and part of the solvent of the low concentration polymer solution is evaporated in a tank to become a solvent gas. Then, the solvent gas is condensed to a condensed solvent, which is drawn out from the concentrating tank. Further, the high concentration polymer solution obtained during the evaporation in the concentrating tank is continuously drained from the concentrating tank.

In the present invention, the concentrating tank includes a tank main body, a roof disposed on the tank main body, at least one flash nozzle inserted into the tank main body, and a drain pipe provided on a bottom of he tank main body. In the tank main body, the low concentration polymer solution is temporary stored while being concentrated. Inner surface of the roof forms a condensation surface for condensing the solvent gas and recovering the condensed solvent. The flash nozzle is positioned under a solution surface of the low concentration polymer solution in the tank main body while the low concentration polymer solution is concentrated. Then the flash nozzle discharges a fresh low concentration polymer solution which is supplied into the tank main body. The drain pipe opens part of a bottom of the tank main body, and the high concentration polymer solution is drained through the drain pipe.

In the present invention, a condensation temperature is preserved in a range of $\pm 10°$ C. from a predetermined condensation temperature value. A flash temperature is preserved in a range of $\pm 10°$ C. from a predetermined temperature to the fresh low concentration polymer solution to be discharged from the flash nozzle. A flash pressure is preserved in a range of $\pm 0.005$ MPa from a predetermined flash pressure value. The flash pressure is a pressure of the fresh low concentration polymer solution to be discharged from the flash nozzle. A drawing flow rate is preserved in a range of $\pm 10\%$ from a predetermined flow rate value.

According to the present invention, as the low concentration polymer solution is continuously concentrated, the high concentration polymer solution is continuously produced. Further, as the fluctuation of the polymer concentration of the high concentrated polymer solution is preserved in a predetermined range, a polymer film is easily formed of the high concentration polymer solution.

In the present invention, one of the following conditions are controlled:
(1) feed flow rate (or volume) for feeding the low concentration polymer solution;
(2) concentrating temperature for concentrating the low concentration polymer solution;
(3) condensing temperature of the condensation surface for condensing the solvent gas;
(4) flow rate (recovery volume) for drawing the condensed solvent, so as to keep the following values constant:
(1) higher polymer concentration of the condensed polymer solution;
(2) flow rate (recovery volume) for drawing the condensed solvent;
(3) height of liquid surface of the intermittent polymer solution in the tank.

Accordingly, the high concentration polymer solution can be produced continuously, and the skinning or the gel-like material is hardly generated on an inner wall of the tank in which the flash evaporation is performed.

Further, as the condensing temperature, the flash temperature, the flash pressure and the feed flow rate are controlled, the high concentration polymer solution can be continuously produced.

Further, when a ratio of a size S1 of the liquid surface in said tank to a size S2 of the condensed surface satisfies a relation of $0.01 \leq (S1/S2) \leq 5$, then the solvent gas is effectively condensed, and the condensed solvent is smoothly recovered. Accordingly, the condensed solvent can be reused for dissolving the polymer, and the low concentration polymer solution can be smoothly concentrated.

When the high concentration polymer solution produced in the present invention is used for forming a polymer film, the polymer film has a constant thickness and a constant surface condition. Such effects become remarkable when the preparation and the concentrating of the low concentration polymer solution, and the forming of the polymer film are made online. Further, as the low concentration polymer solution which can be easily prepared is concentrated to obtain the high concentration polymer solution, the time becomes shorter for forming the polymer film from the high concentration polymer solution, which has a self-supporting property.

In the present invention, as the filtration of the primary or the high concentration polymer solution is made to remove foreign materials, the polymer film is excellent in transmittance and has no optical isotropy. Accordingly, the polymer is used for a protective film for a polarizing filter, and optical products, for example, the polarizing filter and optically functional film, which are excellent in optical property.

BRIEF DISCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
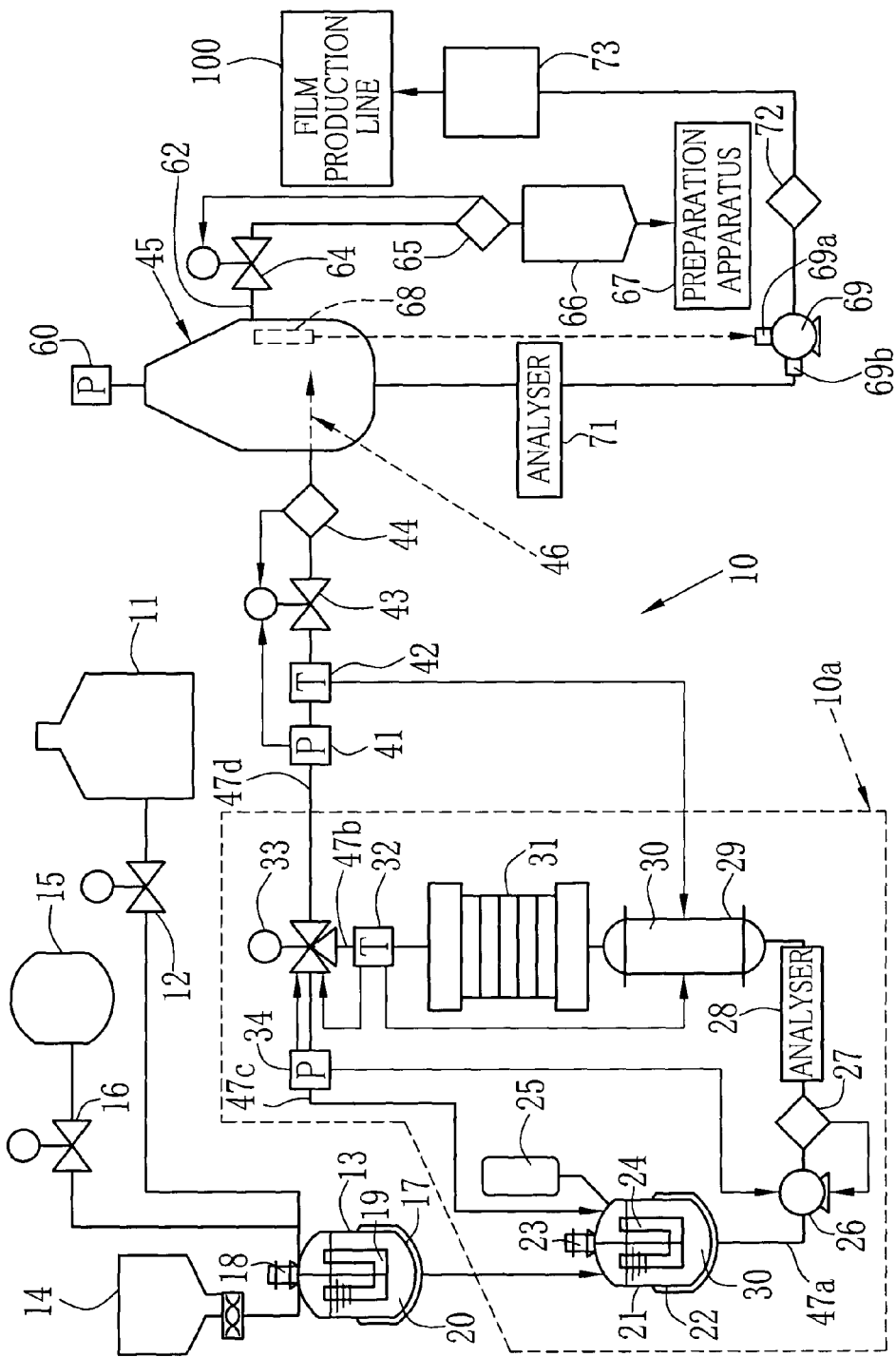
FIG. 1 is a schematic diagram of a first embodiment of a producing line used for a method of producing a polymer solution of high polymer concentration of the present invention.

Polymers, additives and solvents used for a polymer solution are explained at first. Thereafter, a method of producing a polymer solution of high polymer concentration and a method of forming a polymer film from the polymer solution of high polymer concentration are explained. Then the explanation about the formed polymer film and the optical productions will follow in this order.

[Polymer]

The polymers used in the present invention are not restricted. However, cellulose acylate, polycarbonate, aramid polymers, polysulfone, cycloparaffin based polymers (polynorbornene) and the like are preferable. In the cellulose acylate, cellulose acetates are particularly preferable. In the cellulose acetates, cellulose triacetate (TAC) is especially preferable, whose averaged acetyl value is in the range of 57.5% to 62.5%, when the acetyl value is measured in ASTM:D-817-91 (estimating method for cellulose acylate and the like). The acetyl value means a degree in mass of acetic acid combined with cellulose polymer. In the present invention, the cellulose acylate particles may be used. Minimum of 90 wt. % of the cellulose acylate particles have diameter in the range of 0.1 mm to 4 mm, preferably in the range of 1 mm to 4 mm. Further, the ratio of the cellulose acylate particles having diameter in the range of 0.1 to 4 mm is preferably at least 95%, particularly at least 97%, especially at least 98%, and most especially at least 99%. Furthermore, it is preferable that minimum of 50 wt. % of the cellulose acylate particles have diameter in the range of 2 mm to 3 mm. The ratio of the cellulose acylate particles having diameter in the range of 2 mm to 3 mm is particularly at least 70%, especially at least 80%, and most especially at least 90%. Preferably, the cellulose acylate particle has a nearly ball-like shape.

The preferable formation of polymers in the present invention, as which cellulose acylate is used, will be explained. As shown in CF 1, cellulose is a product of polymerization of β-glucose. In the glucose, there are three hydroxide groups (—OH). The first one (H6 and H6') of the hydroxide groups at $6^{th}$ position is acylated as shown in CF 2, the second group (H2 and H2') at second position and the third group (H3 and H3') at third position are acetylated so as in CF2. If the acetyl value of H6 and H6' is represented as A, and the acetyl value of H2, H2', H3 and H3' are represented as B, then the total acylation rate in cellulose acylate is represented as A+B. Preferably, A and A+B satisfy the following formula:

$$2.5 \leq A+B \leq 3.0$$

$$0.7 \leq A \leq 1.0$$

It is to be noted that the groups R in CF 2 represent alkyl group, phenyl group and the like. It is especially preferable to use cellulose triacetate in which the group R is methyl group (—$CH_3$).

CF 1

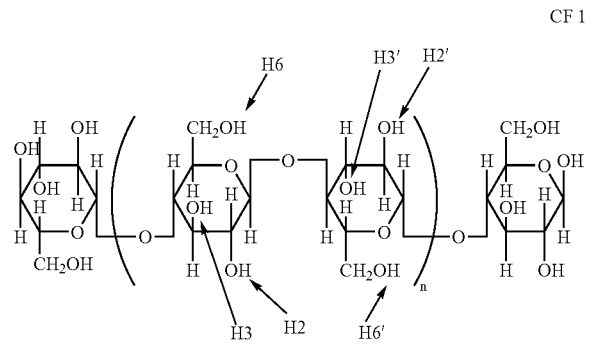

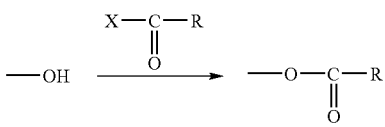

CF 2

[Additives]

As additives used in the present invention, there are plasticizers and ultraviolet absorbing agents (ultraviolet stabilizer). As the plasticizers, for example, there are phosphoric acid esters (for example, triphenyl phosphate (herein after TPP), tricresylphosphate, cresyldiphenyl phosphate, octyldiphenyl phosphate, biphenyldiphenyl phosphate (hereinafter DBP), trioctyl phosphate, tributyl phosphate and the like), phthalic acid esters (for example, diethyl phthalate, dimethoxyethyl phthalate, dimethyl phthalate, dioctyl phthalate, and the like), grycolic acid esters (for example, triacetin, tributyrin, butylphthalylbutyl grycolate, ethylphthalylethyl grycolate (or ethylphthalylgrycol ethylesters), methylphthalylethyl grycolate, butylphthalylbutyl grycolate, and the like), acetates (dipentaerythritol hexaacetate, ditrimethylolpropane tetraacetate and the like).

As the ultraviolet absorbing agent, there are, for example, oxybenzophenone based compounds, benzotriazol based compound, salicylates based compounds, benzophenone based compounds, cyanoacrylate based compounds, nickel complex salt based compounds, and the like. Especially preferable are benzotriasol based compounds and benzophenone based compounds. Further, the dope may contain several type of additives, such as mold lubricant, peeling agent, fluorine based surfactant. Further, one of the above additives or a mixture of the several sorts of the above additives may be used in the present invention.

[Solvent]

As the solvent used in the present invention, there are, for example, hydrocarbon halides, esters, ketones, ethers, and alcohols. In the hydrocarbone halide, there are, for example, dichloromethane, chlorofolm and the like. In the esters, there are, for example, methyl acetate, methyl formate, ethylacetate, amylacetate, butylacetate and the like. In ketones, there are, for example, acetone, methylethylketone, cyclopentanone, cyclohexanone and the like. In ethers, there are, for example, dioxane, dioxolane, tetrahydrofrane, diethylether, methyl-t-butylether, and the like. In alcohol, there are, for example, methanol and ethanol. Especially preferable are dichloromethane, methyl acetate, methyl formate, acetone, cyclopentanone, cyclohexanone, dioxolane. It is preferable to dehydrate the solvent before use. Note that the sorts of the solvents are not restricted in them, and the number of carbons is until 6 in cases of esters, ketones, ethers, and alcohols. One of the above solvents or a mixture of the several sorts of the above solvents may be used in the present invention. The solvent in the present invention is not restricted in the above description. The purification of the solvents may be that in the market.

[Method of Producing Polymer Solution]

As shown in FIG. 1, the TAC, the additives and the solvents are respectively supplied in a measuring hopper 14, an additive tank 15, and a recovery solvent tank 11 in a dope production line 10. At first, a valve 12 is opened that the solvent is fed from the recovery solvent tank 11 to a dissolution tank 13. Then the TAC is fed from the measuring hopper 14 to the dissolution tank 13 with being measured.

Further, a valve 16 is opened such that the necessary amount of the additives dissolved in an additive solution is fed from the additive tank 15 to the dissolution tank 13. Note that there are several methods for feeding the additives to the dissolution tank 13. For example, when the additives are liquid at a room temperature, then they are fed in a liquid state. When the additives are solid, they can be fed with a measuring hopper. Further, in the additive solution, plural sorts of additives may be dissolved. Furthermore, the plural additives are added, they can be fed from the respective additive tanks independently through pipes into the dissolution tank 13.

Further, the solvent, the TAC and the additives are fed in this order in the above embodiment. However, the feeding order is not restricted in it. For example, the TAC may be previously measured and fed before the solvent. Further, the additives are not added into the dissolution tank 13, but added in following processes.

The dissolution tank 13 is equipped with a jacket 17 which coats a lower side of the dissolution tank 13. In the dissolution tank 13, the dissolution tank 13 is equipped with a stirrer that is driven by a motor 18 to rotate. The dissolution tank 13 further has a high speed stirrer (hot shown) of dizol bar type that has an eccentric mixing shaft, and the high speed stirrer is driven by a motor (not shown) to rotate faster than the rotary stirrer. When the stirrer 19 and the high speed stirrer rotate, then the mixture of the solvent, the TAC, the additives are mixed and stirred so as to dissolve the TAC to the solvent. Thereby, a heat transfer medium is fed into the jacket 17 to adjust the temperature in the dissolution tank 13. Thus a dispersion solution 20 is obtained.

The dispersion solution 20 is fed to a preparation tank 21 in an adjusting section 10a, and when a predetermined amount of the dispersion solution 20 is contained in the preparation tank 21, then the feeding of the dispersion solution 20 stops. The adjusting section 10a is constructed of the preparation tank 21, a heater 29, a selector valve 33 which are cyclically combined by passages 47a-47c formed in pipes (not shown). The preparation tank 21 includes a jacket 22, a motor 23 and a stirrer 24, and a condenser 25. A pump 26 drives to feed in the passage 47a the dispersion solution 20 through a flow meter 27 and an analyzer 28. Then the dispersion solution 20 reaches the heater 29. In the heater 29, the dispersion solution 20 is heated such that the dissolution of the polymer to the solvents may proceed. Thus the dispersion solution 20 becomes a low concentration dope (or non-high concentration dope) 30. The low concentration dope 30 is fed in the passage 47b through a primary filtration apparatus 31 and a thermometer 32, to reach a selector valve (two-way valve) 33. The selector valve 33 is provided for selecting one of the passages 47c and 47d such that the low concentration dope 30 flows in it. The selector valve 33 is previously set so as to feed the low concentration dope 30 into the passage 47c. The pressure of the low concentration dope 30 in the passage 47c is measured by a pressure gauge 34 and thereafter fed back into the preparation tank 21.

While the low concentration dope 30 circulates in the adjusting section 10a, the low concentration dope 30 is heated and part of the solvent becomes gas. The gas is gathered through pipes (not shown) in the condenser 25, liquidized and fed back to the preparation tank 21. The preferable flow rate of the dispersion solution 20 is determined on the basis of flow data obtained by the flow meter 27. Preferably, a near-infrared spectral processing analyzer is used as the analyzer 28 so as to obtain a composition ratio of the low concentration dope 30. However, another analyzer may be used, for example, a measuring apparatus for measuring a propagation rate of supersonic wave. Preferably, a multi-pipe heat exchanger including a static stirrer (not shown) is used as the heater 29. In this case, it is preferable to determine an area of a heating surface and a temperature of a heating medium used in the heater 29, such that overall heat transfer coefficient is at least 50 W/(m²·K). Thus, the low concentration dope 30 can be effectively heated in a short time, and the denaturation of the low concentration dope 30 can be prevented.

The heating temperature is adjusted in the heater 29 on the basis of data obtained by the thermometer 32. In order to regulate the pressure for feeding the low concentration dope 30, the flow rate of the low concentration dope 30 is adjusted on the basis of data obtained by the pressure gauge 34. It is preferable that the concentration of the polymer is in the range of 5 wt. % to 25 wt. %, the temperature in the range of 70° C. to 130° C., the pressure in the range of 0.5 MPa to 4 MPa, and the flow rate in the range of 1 L/min to 1000 L/min.

When the temperature and the pressure measured by the thermometer 32 and the pressure gauge 34 become the predetermined value which is determined in accordance with the main solvent, then the selector valve 33 is set to feed the low concentration dope 30 in the passage 47d. For example, when the main solvent is dichloromethane, then the predetermined value of the temperature is set in the range of 70° C. to 120° C., and the standard dope pressure is in the range of 0.5 MPa to 2 MPa. When the main solvent is methyl acylate, then the predetermine value of the temperature is set in the range of 70° C. to 130° C., and the standard dope pressure is in the range of 0.5 MPa to 2 MPa. Further, the flow rate is controlled to a predetermined value independent of the main solvent, and the predetermined value of the flow rate is preferably in the range of 1 L/min to 1000 L/min.

While being fed in the passage 47d, the low concentration dope 30 flows through a pressure gauge 41, a thermometer 42, a pressure adjusting valve 43 and flow meter 44, sequentially. A forward end of the passage 47d is equipped with a flash nozzle 46 which continues into a concentrating apparatus 45 so as to feed the low concentration dope 30 therein.

The pressure gauge 41 and the thermometer 42 adjust the pressure and the temperature of the low concentration dope 30 flowing in the passage 47d. After flowing through the pressure adjusting valve 43 and the flow meter 44, the low concentration dope 30 is fed out from the flash nozzle 46 to perform the flash evaporation of the solvent. Thus, the low concentration dope 30 is concentrated to become a high concentration dope (or a high concentration dope) 70.

When the flash evaporation is made, then the temperature of the low concentration dope 30 that is measured by the thermometer 42 is almost constant so as to fluctuate in the predetermined temperature ±10° C., preferably in the range of ±5° C., and particularly in the range of ±3° C. The pressure of the low concentration dope 30 that is measured by the pressure gauge 41 is almost constant so as to fluctuate in the range of the predetermined pressure ±0.05 MPa, preferably in the range of the predetermined pressure ±0.02 MPa, and particularly the predetermined pressure ±0.01 MPa. Further, the flow rate of the low concentration dope 30 fluctuates in the range of the predetermined flow rate ±10%, preferably in the range of the predetermined flow rate ±5%, and particularly in the range of the predetermined flow rate ±1%. Furthermore, a standard condensation temperature is predetermined for the condensation surface. The temperature of the condensation surface 55a fluctuates in the range of the predetermined condensation temperature ±10° C., preferably in the range of the predetermined condensation temperature ±5° C., and particularly of the predetermined condensation temperature ±3° C. When these conditiona of fluctuation of the temperature, the pressure and the flow rate are satisfied, then the high concentration dope 70 of the uniform concentration is obtained. Therefore, the high concentration dope 70 has uniform composition.

In order to control the temperature for the flash evaporation, the heating temperature of the heater 29 is adjusted on the basis of data of the thermometer 42. Further, in order to control the pressure for the flash evaporation, the passage 47*d* is opened and closed with the pressure adjusting valve 43. The pressure for the flash evaporation becomes higher by at least 0.1 MPa than saturated vapor pressure of the solvent corresponding to the temperature thereby, so as to make the effective concentration. In this case, the pressure for the flash evaporation may be controlled on the basis of the data of the flow rate that is obtained by the flow meter 44. Note that when the plural sorts of the solvents are used, the pressure for the flash evaporation is set higher by at least 0.1 MPa than highest saturated vapor pressure of the used plural solvents.

In the passages 47*b*-47*d*, as the temperature and the pressure of the low concentration dope 30 are high, the solubility of the low concentration dope 30 is high. Accordingly, contact surfaces of parts for contacting to the low concentration dope 30 are formed of materials having high corrosion resistance to prevent the corrosion in the dope production line 10 and the denaturation of the low concentration dope 30. Preferably, such materials may be used, for example, in primary filtration apparatus 31, the thermometers 32, 42, the selector valve 33, the pressure gauge 41, the pressure adjusting valve 43, the flow meter 44 and the flash nozzle 46 which are equipped on the passages 47-47*d*. As the materials having high corrosion resistance, there are nickel alloy, stainless alloy, titanium alloy and the like. As the nickel alloy, there is a Hastelloy (trade name) can be used. Note that the materials having high corrosion resistance are not restricted in the above description.

When the low concentration dope 30 becomes the high concentration dope 70 in the concentrating apparatus 45, a solvent gas 56*a* (see, FIG. 2) is generated from part of the low concentration dope 30, and thereafter condensed to a condensed solvent 56*b* (see FIG. 2) of the low concentration dope 30 is obtained. The condensed solvent 56*b* is drawn through a pipe 62, an adjusting valve 64, a flow meter 65 into a recovery solvent tank 66. The quantitative analysis of the condensed solvent 56*b* in the recovery solvent tank 66 was made, for example, with gas chromatography. Then the condensed solvent 56*b* is transported to a preparation apparatus 67. After some materials for solvent is added to the condensed solvent 56*b* in the preparation apparatus 67 on the basis of data of the quantitative analysis, the condensed solvent 56*b* is reused as the solvent for dissolving the polymer.

The high concentration dope 70 is continuously fed out from the concentrating apparatus 45 by a pump 69. The flow rate thereby is controlled by a controller 69*a* attached to the pump 69. In an upstream side in the pump 69, there is a pressure gauge 69*b* for measuring a pressure of the pump 69 in the upstream side. The pressure is regarded as a pressure at an entrance of a pipe for feeding out the high concentration dope 70. On the basis of data obtained by the pump 69, the feeding of the high concentration dope 70 from the concentration apparatus 45 is controlled such that the polymer concentration of the high concentration dope 70 may be constant. In the present invention, the pressure thereby is preferably at least 1000 Pa, especially in the range of $10^4$ Pa to $10^5$ Pa. Further, the control by the controller 69*a* prevents a fluctuation of a pressure in a tank main body 50 (see FIG. 2) of the concentrating apparatus 45.

A composition of the high concentration dope 70 fed out from the concentrating apparatus 45 is analyzed with an analyzer 71. In order to vary the composition, the polymer concentration conditions in the concentrating apparatus 45 are changed so as to obtain the high concentration dope 70 with the predetermined composition. After flowing through a flow meter 72 and a secondary filtration apparatus 73, the high concentration dope 70 is used as the polymer solution or the polymer dispersion of high polymer concentration for forming a film in a film production line 100.

In the present invention, a method for preparing the low concentration dope 30 is not restricted in the above description. For example, the low concentration dope 30 is prepared on a batch process. In this case, the flash evaporation is made for each batch.

In the present invention, the adjusting section 10*a* in which the low concentration dope 30 is cyclically fed for adjusting the temperature and the pressure thereof may not be provided in the dope production line 10. However, it is preferable that the adjusting section 10*a* is provided, in order to vary the conditions for the flash condition easily and to obtain the low concentration dope 30 having uniform situations. Further, the additives may be added after preparing the low concentration dope 30.

Figure 2:
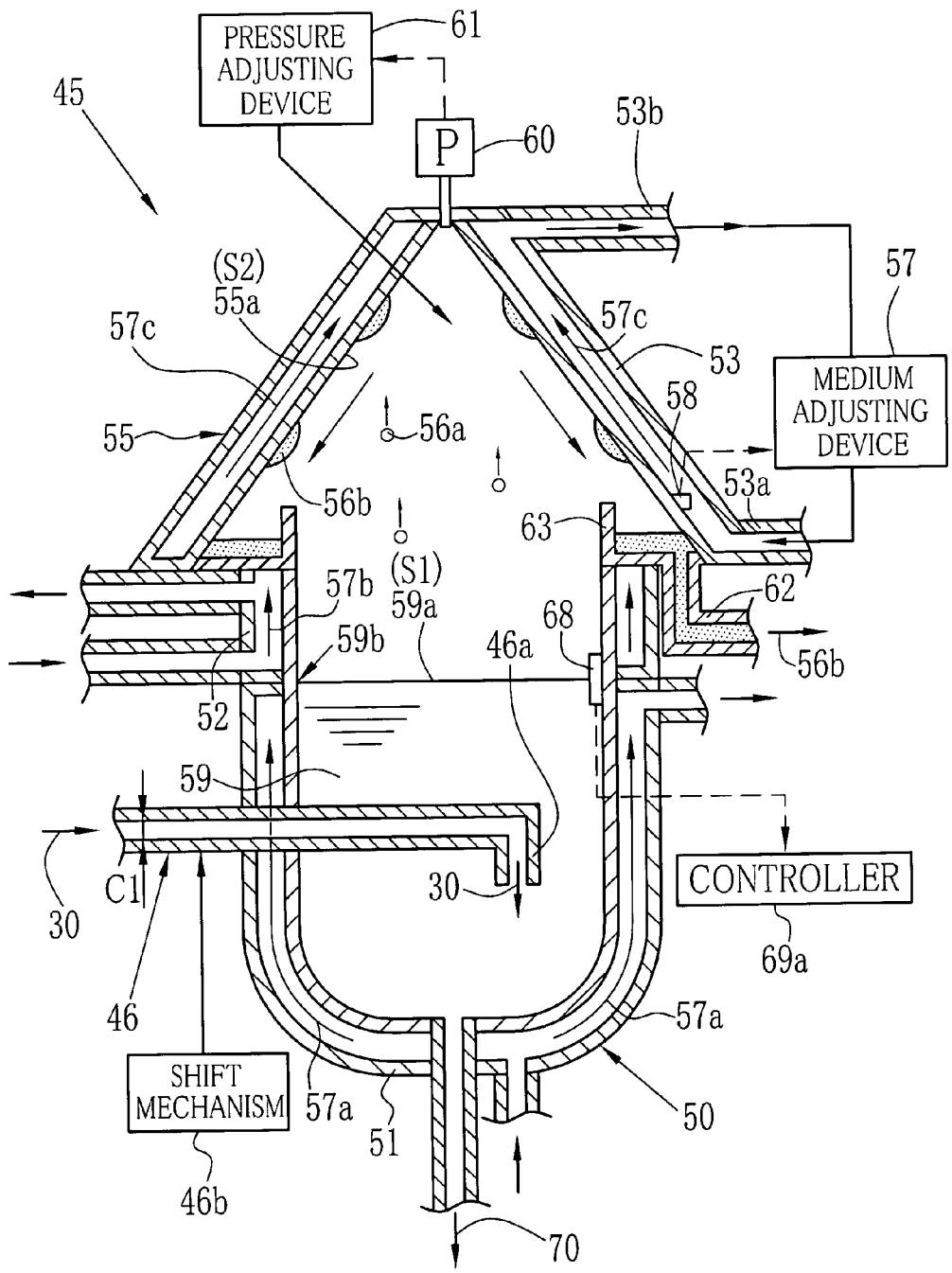
FIG. 2 is a sectional view of a concentrating apparatus used for concentrating a polymer solution.

As shown in FIG. 2, the concentrating apparatus 45 includes a tank, a pressure adjusting device, medium adjusting device, and a shift mechanism 46. The tank and the flash nozzle 46 construct a flash section. The tank has the tank main body 50 and a condensation roof 55. The tank main body 50 is provided with a first jacket 51 and a second jacket 52, and the condensation roof 55 is provided with a third jacket 53. The tank main body 50 is covered with first jacket 51. Inside of each of the first—third jackets 51-53, there is a space in which each heat transfer mediums 54*a*-54 is supplied. Thus the temperatures of the tank main body 55 and the condensation roof 55 are adjusted independently. The adjusting mediums of the first and second jackets 51, 52 are used for heating the tank main body 55, and the adjusting medium of the third jacket 53 is used for cooling the condensation roof 55. Note that the tank main body 55 and the condensation roof 55 are separately formed. In this case, they are combined with each other to form the concentrating apparatus 45. Otherwise, the tank main body 55 and the condensation roof 55 may be integrally formed.

When the low concentration dope 30 is fed into the tank main body 50 through the flash nozzle 46, then part of the solvent evaporates and the low concentration dope 30 becomes a concentrating dope 59 in the tank main body 55. The concentrating dope 56 is contained in the flash section in the concentrating apparatus. The flash nozzle 46 is provided with a shift mechanism 46*b* for shifting the height of the flash nozzle 46 such that an exit 46*a* of the flash nozzle 46 is disposed under a dope surface (or gas-liquid boundary surface) 59*a*. Thus the low concentration dope 30 hardly splashes on an inner surface of the tank main body 50, which prevents the generation of skinning. Further, when the flash evaporation is performed, then evaporation the solvent from the concentrating dope 59 is accelerated, and the concentrating dope 59 becomes the high concentration dope 70. Further, a solvent gas 56*a* is generated thereby and concentrated to a condensed solvent 56*b* on a condensation surface 55*a* of the condensation roof 55. As the condensation surface 55*a* is inclined, the condensed solvent 56*b* flows downwards in effects of gravity and surface tension of the condensed solvent 56b. Thus the condensed solvent 56b is received by a receive surface 63.

Materials of the condensation surface 55a are not restricted. However, it is preferable that a contact angle θ of the condensed solvent 56b to the condensation surface 55a satisfies θ<60°. In this case, the condensed solvent 56b easily flows on the condensation surface downwards in effects of gravity. Further, it is preferable that the materials for the condensation surface 55a may have corrosion resistance. Accordingly, as the materials, there are metallic materials, for example, stainless alloy, nickel alloy, titanium alloy and glass, when the main solvent is dichloromethane, methyl acetate or the like.

A medium supply method of the third jacket 53 will be explained. The third jacket 53 is provided with pipes 53a, 53b. The pipes 53a, 53b connects a medium adjusting device 57 with the space of the third jacket 53. The medium adjusting device 57 determines the temperature and the flow rate of the heat transfer medium 57c on the basis of data obtained by a contact type thermometer 58 which measures a temperature of the heat transfer medium 57c. Thus the temperature of the condensation surface 55a is regulated. Note that, as other medium supply method of the first and second jackets 51, 52 are the same as the third jacket 53, the explanation of them is omitted.

The temperature of the condensation surface 55a is not restricted. However, in the present invention, it is preferable that the temperature of the condensation surface 55a is lower by 2° C. than a boiling point of the solvent under the atmospheric pressure so as to condense the solvent gas 56a. When the plural solvents are used, the temperature of the condensation surface 55a is lower than the lowest boiling point under the atmospheric pressure. Further, it is preferable that the distribution of the temperature over the condensation surface 55a is at most 20° C. In this case, the condensation is performed uniformly over the condensation surface 55a, and the condensed solvent 56b is obtained easily. Note that a non-contact type thermometer may be disposed in an inside of the condensation roof 55 instead of the contact type thermometer 58. Further, the number and the sorts of the thermometers are not restricted in the above description. Furthermore, it is preferable that overall coefficient of heat transfer is at least 50 W/(m$^2$·K), as the condensation can be effectively performed.

When S1 and S2 respectively represent a size of the dope surface 59a and that of the condensation surface 55a, the relation S1/S2 satisfies the following conditions (1)-(3):

$$0.01 \leq (S1/S2) \leq 5 \quad (1)$$

$$0.01 \leq (S1/S2) \leq 1 \quad (2)$$

$$0.01 \leq (S1/S2) \leq 0.5 \quad (3)$$

In case of the condition (1), the condensation is effectively performed. Especially, a size of the concentrating apparatus 45 becomes smaller, and there is a merit in a required space. In case of the condition (2), the saturation of the solvent gas 56a can be prevented in an inner space of the condensing section 55 when the large amount of the solvent gas 56a is generated. Accordingly, the solvent gas 56a becomes the condensed solvent 56b, more effectively. In case of the condition (3), the condensation can be most effectively made. However, the relation (S1/S2) is not restricted in the above region. And the capacity of the tank main body is preferably in the range of 1L to 300L.

The height of the dope surface 59a is detected by a liquid surface sensor 68. The data of the height is sent to the controller 69a, and used for adjusting the flow rate of the high concentration dope 70 which is fed from the polymer concentration apparatus 45.

At an edge 59b of the dope surface 59a, skinning (not shown) can be easily generated when the height of the dope surface 59a fluctuates. In order to prevent the generation of the skinning, the temperatures in the spaces of the first and second jackets 51, 52 are independently controlled. The temperature of the heat transfer medium 57a in the space of the first jacket 51 is controlled such that the evaporation can be easily made in the concentrating dope 59. The temperature of the heat transfer medium 57b in the space of the second jacket 52 is controlled to be lower than that of the gas-liquid equilibrium of the concentrating dope 59 in the tank main body 50. Thus, when the concentrating dope 59 contacts to the inner surface of the tank main body 50 upwards from the dope surface 59a, the skinning is hardly generated. Note that when the plural solvents are used, the above conditions are set in accordance with the lowest temperature of the saturation values under the gas-liquid equilibrium.

As the temperatures of the heat transfer mediums 57a-57c are adjusted independently, there are three different temperature parts on an inner wall of the tank main body 50. Accordingly, the polymer concentration can be effectively made. Further, a predetermined value of the temperature of each heat transfer medium 57a-57c is in the range of 20° C. to 60° C. in space of the first jacket 51, of 40° C. to 100° C. in the space of the second jacket 52, and in the range of −20° C. to 20° C. in the space of the third jacket 53. When the temperature of each heat transfer medium 57a-57c fluctuates in a range of the predetermined value ±10° C., the condition of polymer concentration can be regulated. Further, the temperature of the tank main body 50 is controlled three parts. However, the control of the temperature can be made in tow or more than four parts.

The tank main body 50 is provided with a pressure gauge 60 in order to measure the inner pressure inside. The pressure gauge 60 is connected with a pressure adjusting device 61. The pressure adjusting device 61 adjusts the inner pressure inside the tank main body 50 on the basis of data obtained by the pressure gauge 60. The adjustment of the inner pressure is performed by controlling the flow rate of the low concentration dope 30 and the temperature of the tank main body 55 and the condensation roof 55. It is preferable that the inner pressure is about or maximum of the atmospheric pressure before performing the flash evaporation. Further, it is preferable that the inner pressure is controlled so as to be at most 1.5 MPa during the flash evaporation. In this case, the solvent of the concentrating dope 59 can easily evaporate. Note that there are other methods for adjusting the inner pressure of the tank main body 50 in the present invention on the basis of the data of the pressure gauge 60, for example, opening and closing the adjusting valve 64, and increasing the flow rate of the high concentration dope. In these methods, the pressure adjusting device may be omitted.

In the above embodiment, the condensed solvent 56b flows downwards and out from the concentrating apparatus 45 in effect of the gravity and the surface tension of the condensed solvent 56b. Thus the inner pressure can be preserved at a predetermined value or at least fluctuate in a predetermined rage. In these view points, the cost can become lower. Note that the tank main body 50 may be provided with a transport apparatus (not shown) for transporting the condensed solvent 56b, with or instead of the adjusting valve 64 and the flow meter 65, such that the pressure may be controlled by the transport apparatus. When the transport apparatus is used with the pressure adjusting device 61, then the pressure in the tank main body 50 does not vary so much that the high concentration dope 70 has the uniform polymer concentration.

Further, it is preferable that the size of cross section of the flash nozzle 46 is at most 10 cm$^2$. In this case, the flash evaporation is easily performed. Further, the number of the flash nozzle 46 is not restricted in the above embodiment, and may be minimum of two. Furthermore, the position and the form of the flash nozzle are not restricted in the above embodiment and in FIG. 2. Further, the form of the concentrating apparatus 45 is not restricted in the above embodiment.

Figure 3:
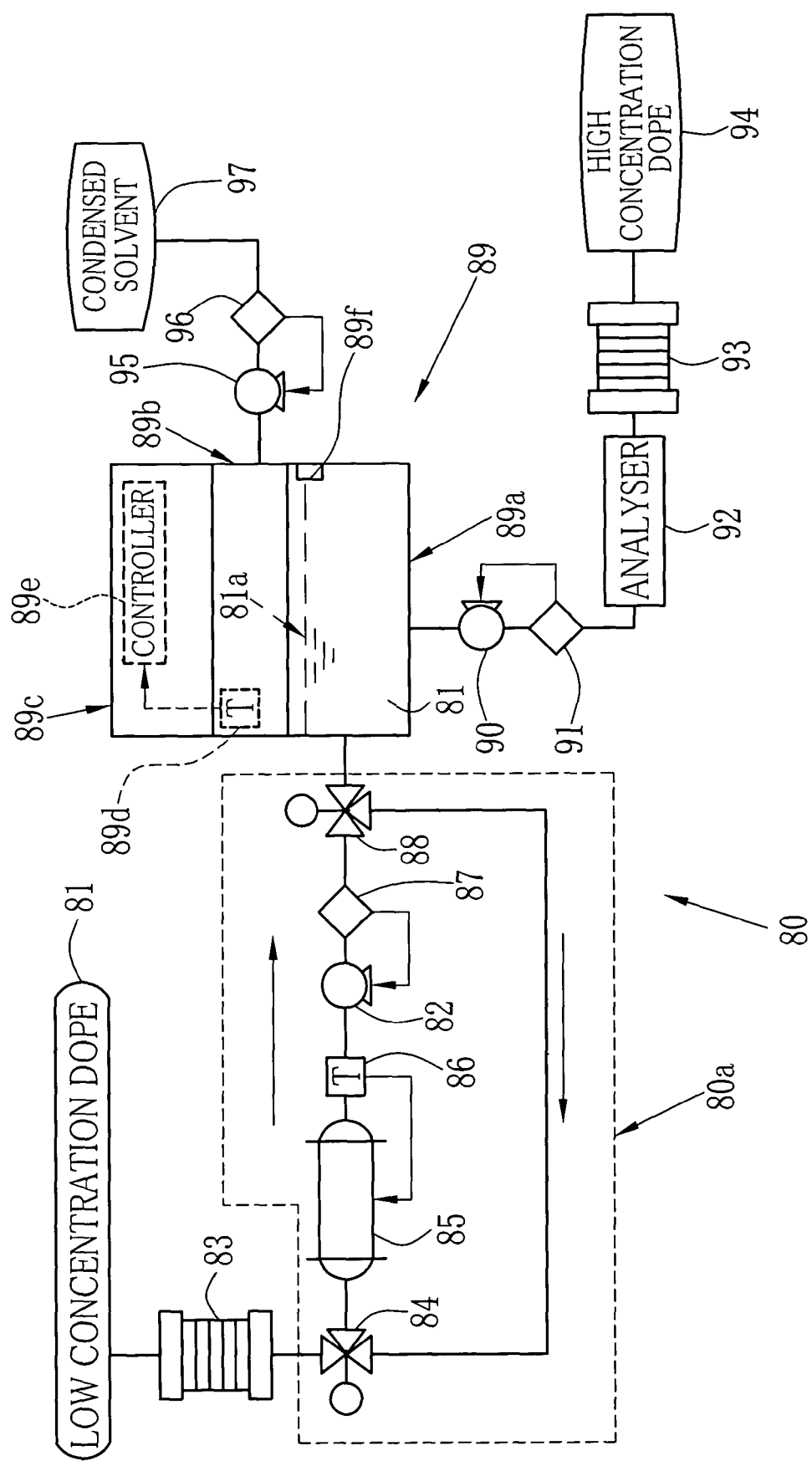
FIG. 3 is a schematic diagram of a second embodiment of the producing line used for a method of producing a polymer solution of high polymer concentration of the present invention.

In a dope production line 80 of FIG. 3, it is preferable that the polymer concentration of a low concentration dope 81 is in the range of 5 wt. % to 25 wt. %. As the polymer in the low concentration dope 81, the TAC is used in this embodiment. However, the sorts of the polymers are not restricted in the embodiment, and other polymers, for example, polycarbonate and the like, may be used as the polymer. As the solvent of the low concentration dope 81, the sorts of the solvents described above, for example, dichloromethane, methyl acetate, may be used. One or a mixture of the solvents may be used in the present invention. Further, when the low concentration dope 81 is prepared, the additives may be added.

A pump 82 is driven to feed the low concentration dope 81 to a primary filtration apparatus 83, and the low concentration dope 81 flows through a selector valve (or two-way valve) 84 to a heater 85. When a predetermined amount of the low concentration dope 81 is supplied in an adjusting section 80a of the dope production line 80, then the feed of the low concentration dope from the primary filtration apparatus 83 is stopped. Then the low concentration dope 81 starts to flow in an arrowed direction in an adjusting section 80a of the dope production line 80. Thereby, the temperature of the low concentration dope 81 is measured with a thermometer 86. The flow rate of the low concentration dope 81 is measured with a flow meter 87 provided downstream of the pump 82. When the temperature and the flow rate doesn't reach predetermined ones, the selector valves 84 and 88 are set so as to circularly feed the low concentration dope 81 in the arrowed direction in the adjusting section 80a.

When the temperature and the flow rate of the low concentration dope 81 become predetermined ones, the selector valve 84 is set to feed the low concentration dope 81 out of the adjusting section 80a to a concentrating apparatus 89. After all of the low concentration dope 81 in the adjusting section 80a is fed to the concentrating apparatus 89, the selector valve 84 is set to cyclically feed in the adjusting apparatus 80a the new low concentration dope 81 supplied from the filtration apparatus.

The concentrating apparatus 89 is constructed of a detention section 89a, a condensing section 89b and a temperature adjusting section 89c. In the containing section 89a, the low concentration dope 81 is contained and the solvent thereof is evaporated to become a solvent gas and to obtain a high concentration dope (not shown) from the low concentration dope 81. In the condensing section 89b, a solvent gas is condensed to become a liquid dope.

In the concentrating apparatus 89, a thermometer 89d is attached to the condensing section 89b in order to measurer the temperature of the condensing section 89b, and is connected with a controller 89e which is provided with a temperature adjusting section 89c. The controller 89e controls the temperature of the temperature adjusting section 89c on the basis of data obtained by the thermometer 89d. Note that the temperature adjusting section 89c and the concentrating apparatus 89 may be separately formed. Further, it is preferable that the temperature adjusting section 89c adjusts the temperature of the containing section 89a. In this case, the amount of the solvent to be evaporated from the low concentration dope 81 can be easily controlled. Further, the concentrating apparatus 89 is provided with a liquid surface sensor 89f to detect the height of a dope surface 81a of the low concentration dope 81 in the containing section 89a.

A pump 90 drives to draw the high concentration dope out of the concentrating apparatus 89. Thereby, flow rate of the high concentration dope is measured by a flow meter 91, and a pump controller (not shown) controls the flow rate of the high concentration dope on the basis of data obtained by the flow meter 91. An analyzer 92 analyzes the composition of the high concentration dope. When the composition analyzed by the analyzer 92 is about the predetermined one, the high concentration dope is filtrated by a secondary filtration apparatus 93, and thereafter, used as the polymer solution of high polymer concentration for forming a film in the film production line 100 (see, FIG. 1).

Further, a pump 95 drives to extract the condensed solvent from the concentrating apparatus 89. Speed of extracting the solvent (flow rate for drawing out the solvent) is measured by a flow meter 96 and controlled so as to continuously perform the evaporation and condensation of the solvent in the concentrating apparatus 89. Part or total of the drawn solvent is reused as the solvent 97 for preparing the low concentration dope 81 such that the cost becomes lower. Further, the amount of the waste solvent is reduced. Therefore the cost for the waste solvent does not become so much.

In the present invention, the shape of the concentrating apparatus 89 is not restricted, when the concentrating of the low concentration dope 81 is continuously performed so as to obtain the high concentration dope. For example, instead of the concentrating apparatus 89, a membrane separation apparatus, a freeze separation apparatus (for example, a cooling-precipitating apparatus), or an evaporation apparatus for evaporating in low pressure and low temperature may be used.

In the above embodiment, in order to obtain the high concentration dope 94 without dusts, the filtration is performed before and after the concentrating of the low concentration dope 81. However, the filtration may be performed before or after the concentrating of the low concentration dope 81, in the present invention.

When polymer concentrations in the low concentration dope 81 and in the high concentration dope 94 is respectively represented with $C_L$ and $C_H$, then it is preferable that the difference ($C_H$–$C_L$) is in the range of 1 wt. % to 20 wt. %. When the difference is less than 1 wt. %, the polymer concentrations of polymer in the low concentration dope 81 and the high concentration dope 94 does not almost vary. Further, when the concentrating of the low concentration dope 81 is made such that the polymer concentration of the obtained high concentration dope 94 may be minimum of 20 wt. %, then the time for concentrating becomes long, and deterioration of the low concentration dope 81 can be easily generated. Further, solutes (polymers and additives) are generated in the concentrating apparatus 89. When the speed for concentrating the low concentration dope is too large, the solutes may be easily precipitated in the concentrating apparatus 89. In this case, the solutes are often adhered onto an inner surface of the concentrating apparatus 89. In the present invention, the generated solutes hardly dissolve in the solvent. Accordingly, a long time is necessary to cleanse the inner surface of the concentrating apparatus 89 for removing the generated solutes, and therefore the cost is increased. However, in the present invention, the regions for fluctuation of the polymer concentration of the low or high concentration dope 81, 94 are not restricted in the above description. The polymer concentration of the high concentration dope 94 may be at least 20 wt. %, which depends on the sort of the solutes (mainly polymer).

The continuous production of the high concentration dope 94 fluctuates the concentration of the high concentration dope 94, even though the producing condition is the same. In the present invention, therefore, the polymer concentration of the high concentration dope 94 is preciously determined to a range of $C_H \pm (C_H - C_L) \times 10\%$, while $(C_H - C_L)$ is a difference between the predetermined value $C_H$ of the concentration of the high concentration dope 94 and the concentration $C_L$ of the low concentration dopes 94, 81. Otherwise, the variable region may be determined to the range of $C_H \pm 5$ wt. %.

In order to preserve the polymer concentration of the high concentration dope 94 almost constant in the variable region, at least one of the following conditions must be adjusted.

(1) flow rate (or volume) for feeding the low concentration dope 81 to the concentrating apparatus
(2) temperature in concentrating the low concentration dope
(3) temperature of the condensation surface for condensing the solvent gas
(4) flow rate (or recovery volume) for drawing the condensed solvent out
(5) height of the liquid surface 81a (or gas-liquid boundary surface) of the low concentration dope in the concentrating apparatus 89
(6) flow rate (or volume) for drawing out the high concentration dope from the concentrating apparatus For example, the adjustment of the high concentration dope 70 can be made only for the condition of (1), or in combination of the conditions of (1), (2) and (3), so as to keep the polymer concentration constant.

It is supposed that the low concentration dope is prepared while the main solvent is methyl acetate and a total concentration of the polymer and the additives is 15 wt. %. Each of the containing section 89a and the condensing section 89b has volume in the range of 3L to 4L, and the condensation surface has a size in the range of 300 cm² to 800 cm². In this case, the adjustment is made under the conditions (1), (2) and (4). Namely, (1) the flow rate of the low concentration dope 81 is adjusted in the range of 1 L/min to 2 L/min, (2) the temperature of the low concentration dope is in the range of 90° C. to 120° C., and (4) the flow rate for drawing the condensed solvent is in the range of 0.03 L/min to 0.07 L/min. The predetermined concentration of solutes in the high concentration dope is in the range of 18 wt. % to 22 wt. %. Then, the solute concentration of the high concentration dope is almost constant so as to fluctuate in the range of ±0.3% to −0.3% from the standard concentration.

In order to keep the concentration of the high concentration dope constant, it is preferable to control the flow rate for drawing a condensed solvent 97 out from the concentrating apparatus 89. In this case, the adjustment is made under at least one of the conditions (1), (2) and (3). For example, (1) the flow rate of the low concentration dope 81 is adjusted in the range of 0.95 L/min to 1.05 L/min, (2) the temperature of the low concentration dope is in the range of 90° C. to 120° C., and (3) the temperature of the condensation surface is in the range of 0° C. to 15° C. The predetermined flow rate of drawing the condensed solvent is set in the range of 0.03 L/min to 0.07 L/min. When the high concentration dope 94 is obtained, the flow rate for drawing the condensed solvent 97 is almost constant to fluctuate in the range of +5% to −5% from the standard flow rate.

In order to keep the concentration of the high concentration dope constant, it is preferable to control the height of the dope surface 81a of the low concentration dope 81 in the concentrating apparatus 89 on the basis of data obtained by the liquid surface sensor 89f.

In this case, the adjustment is made under at least one of the conditions (1), (2) and (4). Namely, (1) the flow rate of the low concentration dope 81 is adjusted in the range of 0.95 L/min to 1.05 L/min, (2) the temperature of the low concentration dope is in the range of 90° C. to 120° C., and (4) the flow rate for drawing the condensed solvent is in the range of 0.03 L/min to 0.07 L/min. The predetermined height is set at zero position. The value of the height becomes negative when the dope surface is lower than the zero position. Then, the height of the dope surface fluctuates in the range of −1 cm to +1 cm from the standard height.

Further, it is preferable to adjust at least one of other conditions (3) and (6). For example, (3) the temperature of the concentrating surface is in the range of 5° C. to 10° C., and (6) the flow rate of the high concentration dope from the concentrating apparatus is 0.03 L/min to 0.07 L/min.

Preferably, walls (not shown) of forming the passages of the solvent, the low concentration dope, the concentrating dope or the high concentration dope has surface roughness (Ra) of maximum of 10 μm. When the Ra is more than 10 μm, an irregular flow occurs during feed in the dope production line 100, and a composition of the high concentration dope cannot be constant. Note that the skinning and the gel-like materials are generated on the wall so as to hardly cleanse it. The Ra is preferably small. However, when it is so small as that of a glass, the cost becomes too high. Note that the Ra is not restricted in maximum of 10 μm. For example, the Ra is determined in accordance with the flow rate of the solvent and the like, the composition range of the high concentration dope, and the cost for producing the high concentration dope in the dope production line.

In the dope production line of the present invention, the number of the concentrating apparatus is not restricted in the above description, and plural concentrating apparatuses may be provided. In this case, the producing line may have plural heaters, first pumps for feeding the low concentration dope, and second pumps for feeding the high concentration dope, third pumps for drawing out the condensed solvent, an analyzer for analyzing the high concentration dope and the like. The one concentrating apparatus is connected with the one heater, the one first pump, the one second pump, the one third pump and the analyzer. Thus, the concentrating of the low concentration dope is performed in several parts such that plural high concentration dopes may be obtained from the one dispersion solution. Furthermore, the number of the concentrating is not restricted in the above description, and may be, for example, two. In this case, the condensed solvents in some of the plural concentrating apparatuses may be connected with the one pump for drawing out the condensed solvents.

Further, a dope preparation line may include from upstream a heating apparatus for heating the low concentration dope, a feed pump, a first concentrating apparatus, a transmitting pump, a second concentrating apparatus, a drawing pump, an analyzer for the high concentrating dope. Namely, the heating apparatus and the feed pump are disposed in an upstream side of the dope preparation line. Note that the transmitting pomp draws a middle concentration dope which has been concentrated in the first concentration apparatus, and transmits it to the second concentration apparatus. Further, each of the first and second concentrating apparatuses has a pump for drawing a condensed solvent. Otherwise, the condensed solvent may be drawn through a pump out of the first and second concentrating apparatuses. Further, the number of the concentrating apparatus may be more than three.

[Method of Forming Polymer Film from Dope]

Figure 4:
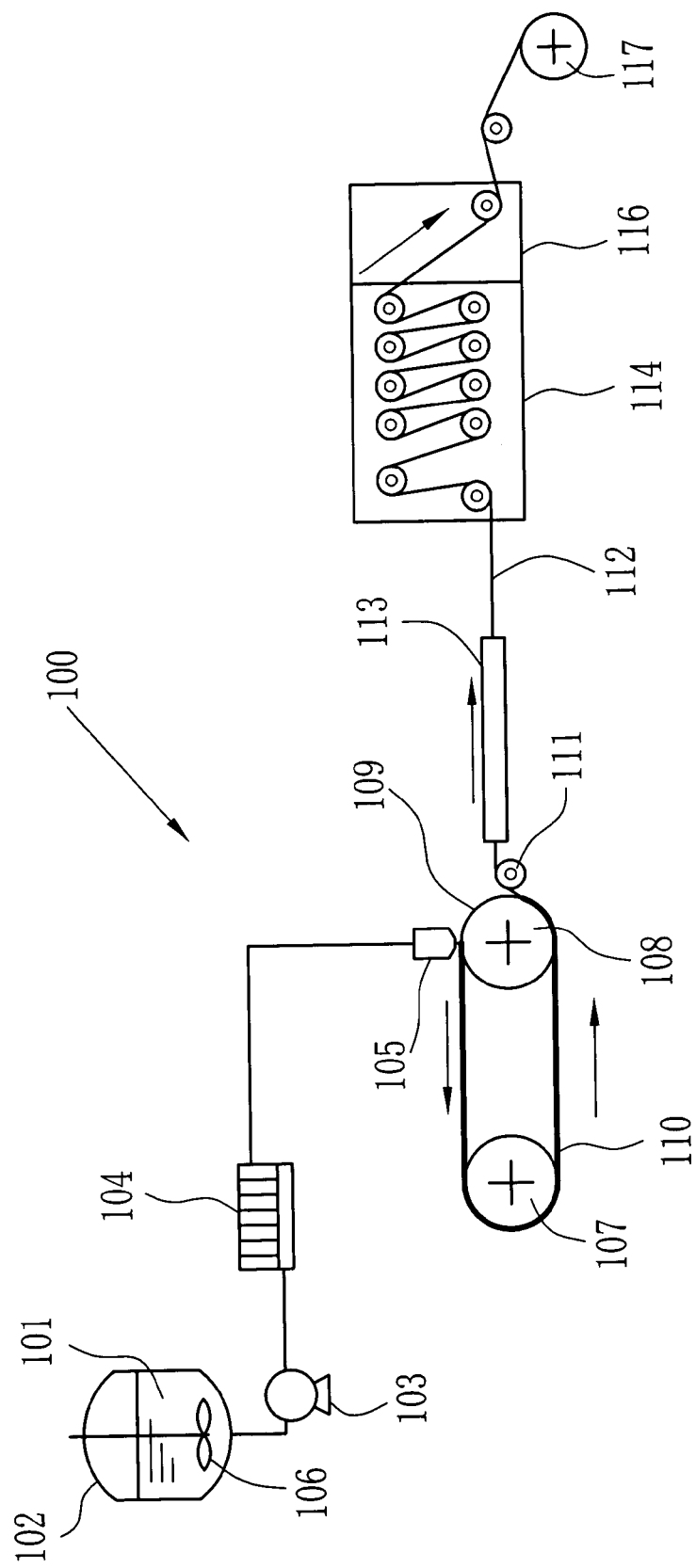
FIG. 4 is a schematic diagram of a film manufacturing line for forming a polymer film from the polymer solution of high polymer concentration.

As shown in FIG. 4, the high concentration dope 70 is used for forming a polymer film 112 in the film production line 100. The high concentration dope 70 is contained in a tank 102. The concentration of the high concentration dope 70 is in the range of 15 wt. % to 40 wt. % to be adequate for forming the polymer film. However, the polymer concentration is not restricted in the above description. The tank 102 is connected with a casting die 105 through a pump 103 and a filtration apparatus 104. The tank 102 is provided with a stirrer 106 which a motor (not shown) drives to rotate for the uniform concentration of the high concentration dope. Further, the additives, such as the plasticizers and the ultraviolet absorbing agent and the like, can be mixed to the high concentration dope 70.

A band 109 is disposed below the casting die 105 and supported with rollers 107, 108. The rollers 107, 108 are rotated by a driver (not shown) such that the band 109 moves in an arrowed direction. When the pump 103 is driven, then the high concentration dope 70 is fed to the filtration apparatus 104 in which impurities and the like are removed from the high concentration dope 70. Thereafter, the high concentration dope 70 is fed to the casting die 105, and is cast from the casting die 105 on the band 109. The high concentration dope 70 becomes a gel-like film 110 at first, and thereafter dried on the band 109 gradually to have self-supporting property. Thus the gel-like film 110 is peeled as a polymer film 112 from the band 109 by a peel roller 111.

The polymer film 112 is transported to a tension frame (or tenter) 113, in which the hot air is blown to dry the transported polymer film 112. In this case, for example, the polymer film 112 was tensed at least in a widthwise direction to have a predetermined width. Then, the polymer film 112 is fed from the tension frame 113 to a drying area 114, and dried further in the drying area 114. Thereafter, the polymer film 112 is fed to a cooling area 116, and rolled up by a winding apparatus 117. Note that when the polymer film 112 is fed out from the cooling area 116, the side edges thereof may be cut off and the knurling may be performed.

Figure 5:
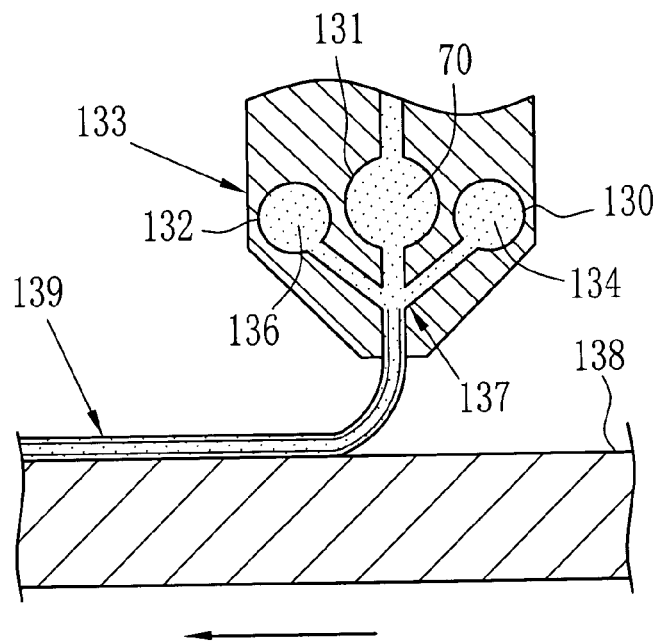
FIG. 5 is a sectional view of a first embodiment of a casting die used in the film manufacturing line in FIG. 4.

In the above embodiment, the number of the high concentration dope cast on the belt is one. However, the number is not restricted in it. For example, in FIG. 5, a casting die 133 is a multi-manifold casting die having plural manifolds 130, 131, 132 that can be supplied with three different sorts of dopes 134, 70, 136 through feed pipes (not shown). The dopes 70, 134, 136 are joined downstream from the manifolds 130-132 and cast on a band 109 having a three layer structure to form a gel-like film 139. The gel-like film 139 is dried and thereafter peeled from the band as a polymer film (not shown). Note that the casting die is not restricted in this description in the method for forming the polymer film. For example, a feed block in which the plural dopes are joined may be provided upstream from the casting die to cast several sorts of the dopes on the band 109 at the same time.

Figure 6:
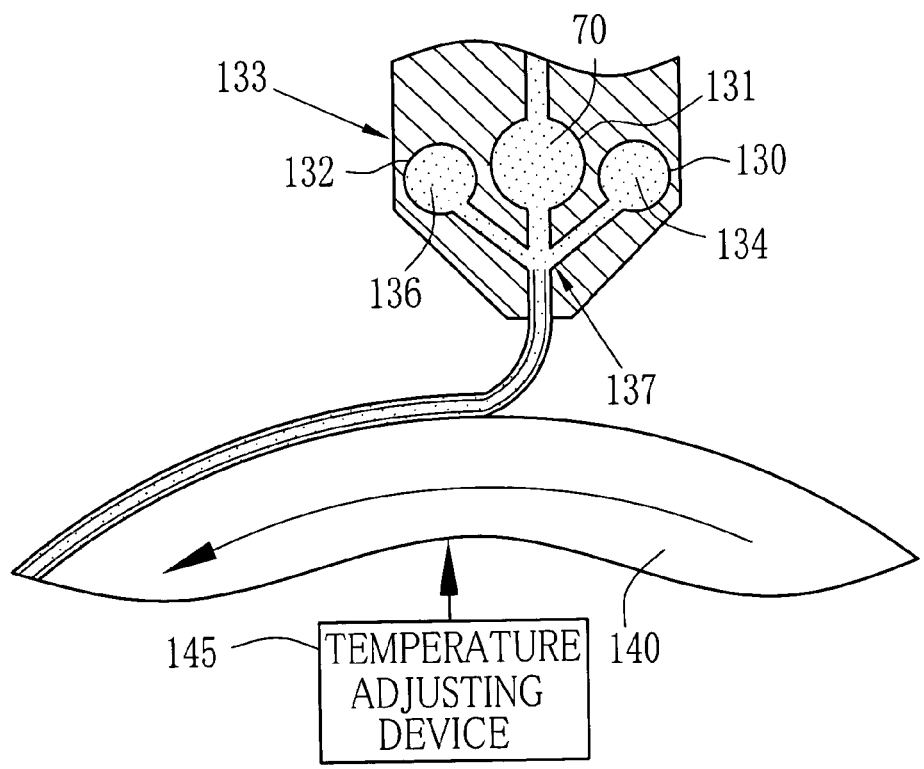
FIG. 6 is a sectional view of a second embodiment of a casting die used in the film manufacturing line in FIG. 4.

In FIG. 6, a rotary drum 140 is provided below the casting die 133, and the dopes 70, 134, 136 are cast on a rotary drum 140. The rotary drum 140 is connected with a temperature adjusting device 145 for adjusting the temperature of the rotary drum 140. (Usually, the temperature adjusting device 145 cools the rotary drum 140, and sometimes heats it.) Note that the temperature adjusting device 145 may not be provided.

Figure 7:
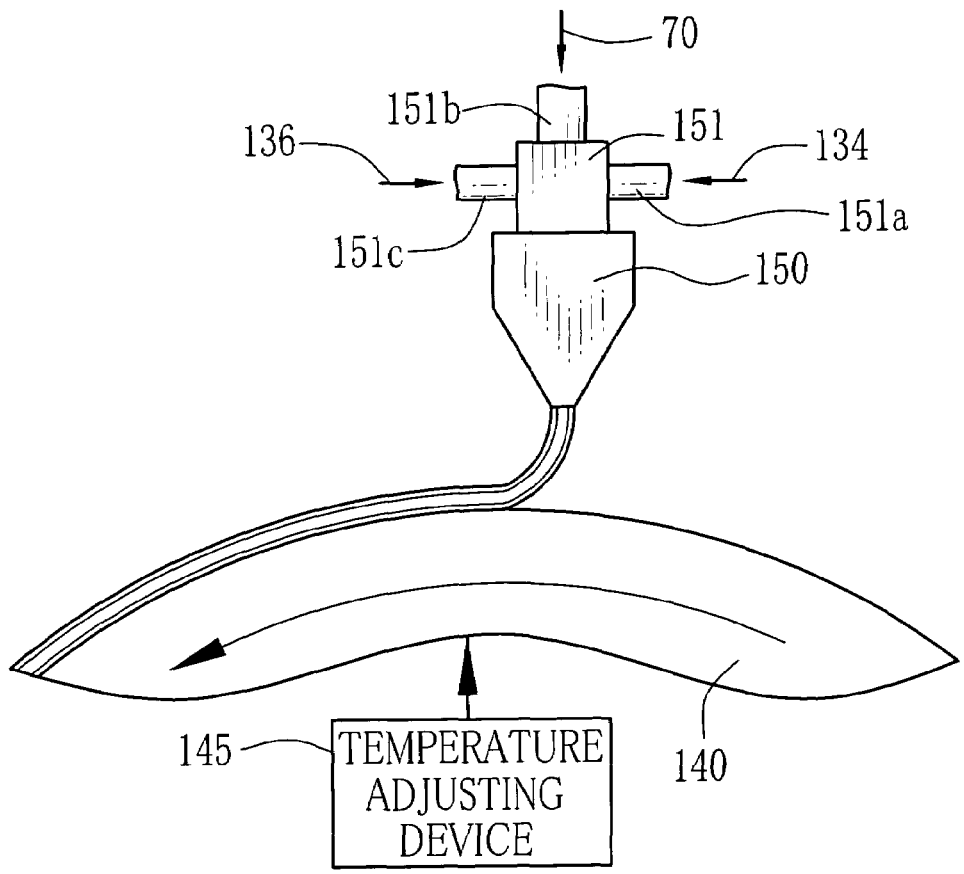
FIG. 7 is a sectional view of a third embodiment of a casting die used in the film manufacturing line in FIG. 4.

In FIG. 7, a feed block 151 in which the three dopes 70, 134, 136 are joined may be provided upstream from a casting die 150. Three pipes 151a-151c are attached to the feed block 151, and the dopes 70, 134, 136 are fed through the respective pipes 151a-151c to the feed block 151. The dopes 70, 134, 136 were joined in the feed block 151. Further, a single-manifold casting die may be used to cast the high concentration dope 70 on the rotary drum 140.

Figure 8:
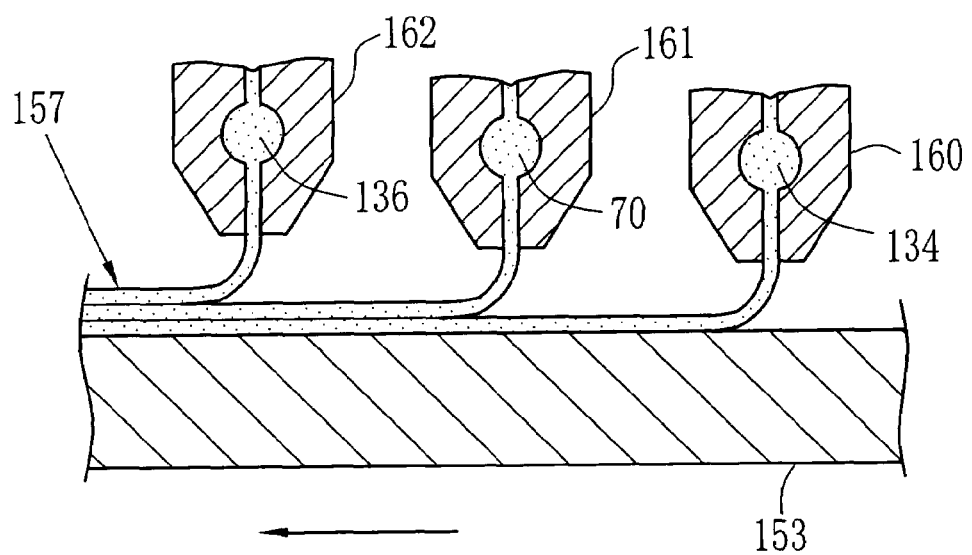
FIG. 8 is a sectional view of a forth embodiment of a casting die used in the film manufacturing line in FIG. 4.

In FIG. 8, three casting dies 160, 161, 162 are arranged above the band 109. The casting dies 160-162 are respectively supplied with dopes 134, 70, 136 through feed pipes (not shown). The dopes 70, 134, 136 are cast on the band 109 sequentially, dried to form a polymer film. Note that the number of the casting dies is not restricted in the above description, and may be, for example, two, four, and the like. Further, the casting dies 160-162 may be used with the casting die 133 in FIG. 5. Furthermore, plural single-manifold casting dies are arranged above the rotary drum to cast the dopes on it sequentially.

Note that the high concentration dope 70 is used for forming an intermittent layer of the polymer film in the above embodiment. However, the present invention is not restricted in it, and the high concentration dope 70 may be used for forming an outer layer of the polymer film. For example, in FIG. 5, the positions of the high concentration dope 70 and the dope 136 may be exchanged, or the dope 136 may be the high concentration dope 70. Furthermore, the high concentration dope 94 produced in the dope production line 80 in FIG. 3 may be used instead of the high concentration dope 70 in the casting methods above described.

[Film and Product]

The polymer film is cut to obtain ten film samples having size of 5 cm$^2$. Each film sample, while being sandwiched between polarizes films in cross-nicol position, is observed to know whether there is a light point defect. In the present invention, when the number of the light point defect having size of minimum of 20 μm is at most 200 in the size of 1 cm$^2$ on the sample, then the polymer film is determined to have a good characteristic. Preferably, the number of the light point defect having size of at least 15 μm is at most 100 in the size of 1 cm$^2$ on the film sample, and especially preferably maximum of 50. Note that the size and the number of the light point defect are not restricted in the above description, and may be in the region to provide necessary properties for the polymer film.

In order to obtain the polarizing filter, the two polymer film can be used for a protective film. When the protective films are adhered to both surfaces of a polarizer formed of polyvinyl alcohol and the like, the polarizing filter is obtained. Further, when the polymer film is adhered to an optical compensation film, then an optical compensatory sheet is obtained as a product. Furthermore, when an antiglare layer is formed on the polymer film, then an optical functional film, for example antireflection film and the like, is obtained as the product. These products can be used for a liquid crystal display.

[Experiment]

Experiments of Examples 1-7 were performed, and the explanation thereof will be made. Examples 1-4 were examined about the method of producing the high concentration dope. The explanations about Examples 1, 2 will be made in detail, and the same explanations about Examples 3-4 will be omitted. Further, in Examples 5-6, the method of forming the polymer film from the high concentration dopes was examined. In Example 7, the experiment about the method of forming the polymer film from the high concentration dope produced in Examples 1. In Examples 5-7, the polymer film was used to manufacture optical functional members, such as the polarizing filter, the optical compensatory sheet, and the antiglare and antireflection film, and the evaluations thereof were made.

EXAMPLE 1

In Example 1, the dope production line 10 was used. In the dissolution tank 13, a dope A was prepared as a low concentration dope. The rotation speed of the low speed stirrer was 120 rpm, and that of the high speed stirrer was 2000 rpm. Thus the dispersion and dissolution of the dope A were made to obtain the dispersion solution 20. The temperature for the dispersion was 25° C. and the time thereof was 30 minutes.

Further, the dispersion solution 20 was fed to the preparation tank 21 to perform the dissolving at 40° C. for 120 minutes. Furthermore, the pump 26 drove to feed the dispersion solution 20 to the heater 29, a heat exchanger of multi-pipe type, in whose pipes static stirrers were provided. In the heater 29, the temperature of the liquid solution was increased to 110° C. to obtain the low concentration dope 30, while the heating medium was steam. Thereafter, the low concentration dope 30 was fed to flow through the primary filtration apparatus 31, the thermometer 32, the selector valve 33, and the pressure gauge 34 to the preparation tank 21.

Thereby, as the evaporated solvent was condensed and fed back to the preparation tank 21, the composition of polymers in the low concentration dope 30 was kept. When the temperature measured by the thermometer 32 reached the predetermined one, then the selector valve 33 was set to feed the low concentration dope 30 to the tank main body 50 such that the flash evaporation was made at the exit 46a of the flash nozzle 46. The heater 29 was set to heat the low concentration dope 30 such that the temperature of the low concentration dope 30 measured by the thermometer 42 might become to 100° C. Further, the pressure adjusting valve 43 was adjusted such that the pressure of the low concentration dope 30 measured by the pressure gauge 41 may become 1.2 MPa.

The height of the exit 46a of the flash nozzle 46 was adjusted such that the exit 46a might be positioned under the dope surface 59a of the concentrating dope 59. Thereby the pump 69 was driven to control the feed of the high concentration dope 70 on the basis of data obtained by the liquid surface sensor 68 to keep the height of the dope surface 59a constant. The condensation surface 55a was cooled to 3° C. to condense the solvent gas 56a to a condensed solvent 56b. The condensed solvent 56b flew downwards and was gathered in the receive surface 63. The adjusting valve 64 was adjusted to open the pipe 62 on the basis of data of the flow meter 65 to control the flow rate of the condensed solvent 56b in the pipe 62. Thus the condensed solvent 56b was gathered in the recovery solvent tank 66. The quantitative analysis of the condensed solvent 56b is made in a method of gas chromatography to obtain the composition thereof. On the basis of the data thereof, the preparation apparatus adjusts the composition of the solvent to be used for preparing the low concentration dope 30.

The total heat transmission coefficient of the condensation surface calculated from the condensation latent heat of the solvent gas 56a was 350 W/(m$^2$·K), and the difference between the highest and the lowest total heat transmission coefficient was maximum of 20%. The total size S2 of the condensation surface 55a was twice as large as the size S1 of the dope surface 59a. The height of the dope surface 59a fluctuated in the range of −10 mm to +10 mm from a standard height.

The contact surfaces contacting to the low concentration dope 30 in the heater 29 and in the primary filtration apparatus 31 were made of alloy, Hastelloy (trade name), and the walls of the passages 47a-47d were made of SUS 316L. The contact surface and the passages 47a-47d were buffed to have surface roughness (Ra) at most 0.5 μm. Further, a size of the cross section C1 of the flash nozzle 46 was 0.04 cm$^2$.

As the analyzer, near-infrared spectral processing analyzer HR-800 (Trade name, produced by Yokogawa electric. Corp.) was used. While the flash evaporation was made for three hours, the concentration of the high concentration dope 70 that was measured with the analyzer 71 after flash evaporation was 22.3 wt. % and fluctuated in the range of −0.8 wt. % to +0.8 wt. %. The increased amount of the solid content was at most 0.2 wt. %. When the concentration of the high concentration dope 70 measured by the analyzer 71 was not predetermined one, the adjustment of the temperature of the low concentration dope 30 for the flash evaporation was made. For the adjustment, the temperature of the heating medium in the heater 29 was varied in accordance with the temperature of the low concentration dope 30 that was measured by the thermometer 42. Thereby the temperature distribution of the condensation surface 55a was maximum of 8° C.

The inner pressure of the condensation roof 55, which was measured by the pressure gauge 60, was controlled by adjusting the temperature of the heat transfer medium 57c in the third jacket 53. Note that when the inner pressure of the tank main body was hardly controlled by the medium adjusting device 57, then the pressure adjusting device 61 was actuated. The inner pressure in the condensation roof 55 that was measured with the pressure gauge 60 was 50 Pa lower than the atmospheric pressure.

In order to control the pressure for the flash evaporation, the pressure adjusting valve 43 was manipulated to open the passage 47d on the basis of data of the pressure gauge 41. Further, the flow rate of the high concentration dope 70 drawn out from the tank main body 50 was controlled to be 8.25 L/min. In this case, the pressure of the low concentration dope 30 for the flash evaporation that was measured by the pressure gauge 41 fluctuated in the range of −0.03 MPa to +0.03 MPa.

The flow rate of the low concentration dope 30 that was measured by the flow meter 27 was controlled to be 10 L/min. The flow rate measured by the flow meters 27 and 72 fluctuated in the range of −5% to +5%.

[Composition of Dope A]
The standard dope A was composed as follows:

| | |
|---|---|
| Cellulose triacetate (pulp material, acetyl value was 60.9%, polymerization degree was 305, 6-substitution degree of acetylate was 0.75, average diameter of particle was 1.5 mm) | 12 pts. wt. |
| Cellulose triacetate (pulp material, acetyl value was 61.2%, polymerization degree was 322, 6-substitution degree of acetylate was 0.72, average diameter of particle was 1.1 mm) | 2 pts. wt. |

-continued

[Composition of Dope A]
The standard dope A was composed as follows:

| | |
|---|---|
| Cellulose triacetate | 2 pts. wt. |
| (cotton linter material, acetyl value was 61.2%, polymerization degree was 362, 6-substitution degree of acetylate was 0.72, average diameter of particle was 1.3) | |
| Triphenyl phosphate (TPP) | 1.5 pts. wt. |
| Biphenyl diphenyl phosphate (BDP) | 0.5 pts. wt. |
| Benzotriazol based UV-absorbing agent | 0.2 pts. wt. |
| Particles | 0.1 pts. wt. |
| (silica gel having diameter of 20 nm) | |
| Methylene chroride (dichloro methane) | 69 pts. wt. |
| Methanol | 10 pts. wt. |
| n-buthanol | 2.6 pts. wt. |
| Peeling initiators | 0.1 pts. wt. |

(Describes in Example 6 in the Japanese Patent Laid-Open Publication No. S63-129747)

EXAMPLE 2

Dope B was prepared so as to have following composition:

| | |
|---|---|
| Cellulose triacetate | 16 pts. wt. |
| (substitution degree was 2.83, 6-substitution degree of acetylate was 0.96, viscometric average degree of polymerization was 205, (pulp cotton):(linter cotton) = 3:7 (ratio in weight), moisture content was 0.2% by mass, viscosity of 6% by mass of methylene chroride solution was 305 mPa · s.) | |
| Methyl acetate | 56.53 pts. wt. |
| Acetone | 10 pts. wt. |
| Methanol | 5 pts. wt. |
| Ethanol | 10 pts. wt. |
| Lubricant A (dipentaerythritholhexaacetate) | 1.5 pts. wt. |
| Lubricant B (TPP) | 0.5 pts. wt. |
| Particles | 0.1 pts. wt. |
| (silica having diameter of 20 nm) | |
| UV-absorbing agent A | 0.1 pts. wt. |
| (2,4-bis-(octylthio)-6-(4-hydroxy-3,5-di-tert-butylanylino)-1,3,5-triazine) | |
| UV-absorbing agent B | 0.1 pts.wt. |
| (2(2'-hydroxy-3',5'-di-tert-butylphenyl)-5-chrolobenzotriazol) | |
| UV-absorbing agent C | 0.1 pts.wt. |
| (2(2'-hydroxy-3',5'-di-tert-amilphenyl)-5-chrolobenzotriazol) | |
| $C_{12}H_{25}OCH_2CH_2O\text{-}P\ (=O) - (OK)_2$ | 0.05 pts. wt. |
| Citric acid esters | 0.02 pts. wt. |

Processes of the preparation of the dope B will be explained now. Methyl acetate, acetone, methanol and ethanol that are described above were supplied in a stainless dissolution tank, and stirred thereafter with stirring blades. In stirring, powders of cellulose triacetate were added and gradually swollen at 30° C. for three hours to obtain a dispersion solution 20. Note that moisture content of each methylacetate, acetone, methanol and ethanol was maximum 0.2 wt. %.

In order to prepare the dope in a cooling-dissolving method, the dispersion solution was supplied in a cooling-dissolving apparatus (not shown), in which a cooling medium (Florinate, trade name, produced by Sumitomo 3M) cooled to −80° C. by a cooler was used for cooling the dispersion solution. Accordingly, in the cooling-dissolving apparatus, the dispersion solution was fed with a rotation of a feed screw and cooled for three minutes to dissolve the dispersions, and thus a polymer solution was obtained. Thereafter, the polymer solution was heated to have the temperature of 50° C. Then the solution was supplied as the dope B in the preparation tank 21 of FIG. 1. Thereafter, the dope B was concentrated in the same processes and conditions as in Example 1.

The concentration of solid content in the dope B was 18.47 wt. %. The temperature of the dope B for the flash evaporation was 120° C. (measured by a thermometer 42). The pressure of the dope B for the flash evaporation was 1.5 MPa (measured by a pressure gauge 41). Thus the flash evaporation was performed for three hours.

Thereby the temperature distribution of the condensation surface 55a was maximum of 9° C. The overall heat transfer coefficient of the condensation surface calculated from the condensation latent heat of the solvent gas 56a was 280 W/m²·K, and the difference between the highest and the lowest total heat transmission coefficient was maximum of 15%. The pressure in the tank main body 50 was 80 Pa lower than the atmospheric pressure. The height of the dope surface 59a fluctuated in the range of −8 mm to +8 mm from the standard height. The pressure of the low concentration dope 30 for the flash evaporation fluctuated in the range of −0.03 MPa to +0.03 MPa, and the flow rate measured by the flow meters 27 and 72 fluctuated in the range of −5% to +5%. The other conditions were the same as in Example 1. Thus the dope B was concentrated to become a dope D.

The concentration of solid content in the dope D was 25.2 wt. %. In performing the flash evaporation, the concentration of solid content fluctuated in the range of −0.9 wt. % to +0.9 wt. %. The increasing amount of the concentration of the dope D fluctuated in the range of −0.3% to +0.3%. The flow rate of the dope C was 10 L/min, the temperature and the pressure for flash evaporation were 110° C. and 1.8 MPa, respectively. The flow rate of the dope D fed out from the concentrating apparatus 45 was 7.3 L/min. Further, the temperature of the heat transfer medium 57c in the third jacket 53 was adjusted to cool the condensation surface 55a such that the inner pressure in the condensing section may be 80 MPa lower than the atmospheric pressure. Other conditions and processes were the same as in Example 1.

EXAMPLE 3

The processes and conditions were substantially the same as in Example 1. However, in Example 3, the flow rate measured by the flow meter 27 was controlled so as to be 10 L/min.

In order to control the flow rate, several values were adjusted. For example, the temperature for the flash evaporation was set to 100° C., and thereby the temperature of the heating medium in the heater 29 was adjusted to be 115° C. Furthermore, the pressure for the flash evaporation was controlled to be 1.5 MPa by adjusting the size of the open of the pressure adjusting valve 43 on the basis of the pressure gauge 41. The flow rate of the high concentration dope 70 was controlled to be 8.36 L/min. Further, the temperature of the heat transfer medium 57c in the third jacket 53 was adjusted to control the inner pressure of the condensation roof 55 to be 60 Pa lower than the atmospheric pressure. Further, the flow rate of the condensed solvent 56b drawn out from the tank main body 50 was adjusted. Thus the high concentration dope obtained in Example 3 had the predetermined concentration, and was named a dope E. The concentration of solid content in dope E was 22 wt. %, and the concentration of solid content fluctuated in the range of −0.4 wt. % to +0.4 wt. %.

EXAMPLE 4

The processes and conditions were substantially the same as in Example 2. However, in Example 4, the flow rate measured by the flow meter 27 was controlled so as to be 10 L/min.

In order to control the flow rate, several values were adjusted. For example, the temperature for the flash evaporation was adjusted to 100° C., and thereby the temperature of the heating medium in the heater 29 was controlled. Furthermore, the pressure for the flash evaporation was controlled to be 1.5 MPa by adjusting the size of the open of the pressure adjusting valve 43 on the basis of the pressure gauge 41. The flow rate of the high concentration dope 70 was controlled to be 8.53 L/min. Further, the temperature of the heat transfer medium 57c in the third jacket 53 was adjusted to set the inner pressure of the condensation roof 55 to be 10 Pa lower than the atmospheric pressure. Further, the flow rate of the condensed solvent 56b drawn out from the tank main body 50 was adjusted. Thus the high concentration dope obtained in Example 3 had the predetermined concentration, and was named a dope F. The concentration of solid content in dope E was 21 wt. %, and the concentration of solid content fluctuated in the range of −0.4 wt. % to +0.4 wt. %.

[Method of Forming Film from Polymer Solution]

EXAMPLE 5

In order to form a film from a polymer solution, as shown in FIG. 7, the casting die 190 and the rotary drum 140 were used. The dope A (the standard dope) was used as the dopes 132, 134, and the dope C (the high concentration dope) was used as the dope 133. After performing the cast and the dry on the rotary drum 140, the polymer film 112 had an intermittent layer formed of the dope 133 (or the dope C) to have thickness of 30 μm, and outer layers formed of the dopes 132, 134 (or the dope A) to have a thickness of 2.5 μm. The temperature of the dopes 132-134 were 30° C. The surface of the rotary drum 170 was processed with hard chrome plating, and the surface roughness Ra thereof was maximum of 0.02 μm. The temperature of the rotary drum 170 was adjusted to −8° C. by the temperature adjusting device 180.

After peeled from the rotary drum 140, the polymer film 112 was transported to the tension frame illustrated in FIG. 4. In Example 5, the tension frame 113 has six rollers disposed with an interval of 250 mm, and the polymer film 112 were tensed with the tension frame 113. The tension applied to the polymer film 112 in the widthwise direction by the tension frame was maximum of 500 N/m. Further, the temperature in the tension frame 113 became higher in the direction from an entrance to an exit thereof. Namely, the temperature was 60° C. at entrance and 140° C. at exit. In the tension frame 113, the drying was made for 3.5 min.

After 15 seconds have passed from feeding out of the tension frame 113, the temperature of the polymer film 112 became 55° C., and both side edges were cut off. Then the polymer film was transported to the drying area 114. In the drying area 114, the temperature at the entrance was 100° C., and that at exit was 145° C. Namely, the temperature became higher in the direction from the entrance to the exit. Thereby the polymer film 112 was fed with tension in the range of 80 N/m to 150 N/m. After the drying area 114, the polymer film 112 was fed to the cooling area 116 in which the temperature was 30° C. Thereafter, the moisture adjustment was made such that moisture content of the polymer film may become 0.8 wt. %, and the polymer film of 8500 m was wound by the winding apparatus 117. The polymer film was named Sample Film 1. In the winding apparatus, a layon roll was used.

The light point defects on Sample Film 1 were observed to estimate it. In the observation, ten fragments, each of which has a size of 5 cm², were optionally cut off from Sample Film 1, and the number of the light point defects having a size of minimum of 20 μm was counted. The number in a size of 1 cm² was in the range of 62 to 105, and the average thereof was 85. When the number was smaller, the optical properties of Sample Film 1 were excellent.

Further, the retardation Ra of wave of 632.8 nm occurred in the ten fragments, and the average thereof was 1.5 nm. The average retardation Rth in the thickness direction was 30 nm. Furthermore, the transmittance of wave of 615 nm was 99.4% at 25° C. in 60% RH, and the optical isotropy was small. Accordingly, Sample Film 1 was excellent in transmittance.

EXAMPLE 6

The dope B was used as the dopes 132, 134, and the dope D (the high concentration dope) was used as the dope 133. Other conditions were the same as in Example 5, and the obtained polymer film 112 was named Sample Film 2. The estimation of Sample Film 2 was made in the same process as in Example 5. According to the light point defect having the size of minimum of 20 μm, the number in a size of 1 cm² was in the range of 48 to 96, and the average thereof was 78. Further, the average retardation in the ten fragments was 2.3 nm. The average retardation (Rth) in the widthwise direction was 35 nm. Furthermore, the transmittance was 99.6%, and the optical isotropy was small. Accordingly, Sample Film 2 was so excellent in transmittance as Sample Film 1.

EXAMPLE 7

The dope C was used and other dopes were not used. After performing the cast on the rotary drum 140, the dope C has a thickness of 80 m. Other conditions were the same as in Example 5, and the obtained polymer film was named Sample Film 3. The estimation of Sample Film 3 was made in the same process as in Example 5. According to the light point defect having the size of minimum of 20 μm, the number in a size of 1 cm² was in the range of 70 to 86. The average thereof was 78. Further, the average retardation in the ten fragments was 2.5 nm. The average retardation (Rth) in the thickness direction was 33 nm. Furthermore, the transmittance was 93%, and the optical isotropy was small. Accordingly, Sample Film 2 was so excellent in transmittance as Sample Film 1.

[Producing of Polarizing Filter]

Iodine had been absorbed in a poly vinyl alcohol film to obtain a polarizer. Sample Film 1 and Sample Film 2 were adhered with a polyvinyl alcohol based adhesive agent to both surfaces of the polarizer to obtain a sample filter. Thereby the retardation axis were parallel to transmission axis of the polarizer. The sample filter was settled under condition of the temperature at 80° C. and atmosphere of 90% RH for 500 hours.

[Estimation of Polarization Degree]

The parallel transmittance Yp and the direct transmittance Yc in a visible area were measured with a spectrophotometer. Thereafter, a polarization degree P was calculated from the following formula:

$$P=[(Yp-Yc)/(Yp+Yc)]^{1/2} \times 100 (\%)$$

The polarization degrees of Sample Film 1 and Sample Film 2 were minimum of 99.6%. The polarizing filter had the enough endurance.

[Producing and Evaluation of Optical Compensatory Sheet]

Iodine had been absorbed in a poly vinyl alcohol film to obtain a polarizer. Film of Sample Film 1 was adhered with the polyvinyl alcohol based adhesive agent to a surface of the polarizer. Thereby the retardation axis were parallel to transmission axis of the polarizer. Further, Sample Film 1 was saponificated, and thereafter adhered with the adhesive agent of polyvinyl alcohol type to another surface of the polarizer. Thereafter, an optical compensation film (WV film, produced by Fuji Photo Film Co. Ltd.) was adhered with the adhesive agent to the exposed surface of Sample Film 1. Thereby the retardation axes of the optical compensation film were parallel to those of Sample Film 1. Thus the optical compensatory sheet was obtained as Sample Sheet 1. Further, Sample Film 2 was used to produce another optical compensatory sheet under the same conditions as Sample Film 1, and the another optical compensatory sheet was named as Sample Sheet 2.

A pair of Sample Sheets 1 was provided in an liquid crystal display of TFT type, and view angle and contrast were good. Further, when the same experiment was made for Sample Sheet 2, and view angle and contrast were good.

[Producing Antireflection Film]

In order to form an antireflection film, the casting die 190 and the rotary drum 140 of FIG. 7 were used, the dope A (the standard dope) was used as the dopes 132, 134, and the dope C (the high concentration dope) was used as the dope 133. Thus the polymer film 112 was obtained as Sample Film 4. In Sample film 4, the total thickness of outer layers formed of the dopes 132, 134 (the dope A) was 10 μm, and the thickness of an intermittent layer formed of the dope 133 was 60 μm. The total thickness of Sample Film 4 was 80 μm. Other conditions were the same as in Example 5. Further, the dope B (the standard dope) was used as the dopes 132, 134, and the dope D (the high concentration dope) was used as the dope 133. The total thickness of the dopes 132, 134 (the dope B) was 10 μm on the rotary drum 140, and the thickness of the dope 133 (the dope D) was 60 μm. Then the drying was made to obtain a polymer film as Sample Film 5. The total thickness of Sample Film 5 was 80 μm. Other conditions were the same as in Example 6.

(Preparation of Coating Solution A for Antiglare Layer)

In order to prepare a coating solution A for an antiglare layer, a mixture (DPHA, produced by NIPPON KAYAKU CO., LTD.) was used, in which dipentaerythlitol pentaacrylate and dipentaerythlitol hexaacrylate were mixed. The mixture of 125 g and bis(4-metacrylic thiophenyl) sulfide (MPSMA, produced by SUMITOMO SEIKA CHEMICALS CO., LTD.) of 125 g were dissolved in a mixture solvent of 439 g that contained methylethylketone of 50 wt. % and cyclohexanone of 50 wt. %. Thus a first solution was obtained. Further, second solution was prepared. In the second solution, a photoinitiator for radical polymerization (IRGACURE 907, produced by Ciba Geigy Japan Limited) of 5.0 g and photosensitizer (KAYACURE DETX, produced by NIPPON KAYAKU CO., LTD.) of 3.0 g were dissolved in methylethyl ketone of 49 g. The second solution was added to the first solution to obtain an added solution. For examination, the added solution was cast and thereafter solidified in ultraviolet ray to obtain a coating layer, which had reflective index of 1.60.

Further, crosslinked polystyrene particles (name of product: SX-200H, produced by Soken Chemical & Engineering Co., Ltd.) of 10 g, whose average particle diameter was 2 μm, were added to the added solution, and this mixture was mixed to disperse the crosslinked polystyrene particles with a high speed stirrer for an hour. The mixing speed thereof was 5000 rpm. Thereafter, the filtration of the dispersed solution was made with a polypropylene filter having holes whose pore diameter each was 30 μm. Then the coating solution A for antiglare layer was obtained.

(Preparation of Coating Solution B for Antiglare layer)

A mixture solvent containing cyclohexane of 104.1 g and methylethyl ketone 61.3 g was stirred by applying air bubble with an air stirrer. Thereby a coating solution for hard coat (DeSolite KZ-7886A, produced by JSR corporation) of 217.0 g that contained zirconium oxide was added to the mixture solvent to obtain an added solution. The added solution was cast and thereafter solidified in ultraviolet ray to obtain a coating, which had reflective index of 1.61. Further, crosslinked polystyrene particles (name of product: SX-200H, produced by Soken Chemical & Engineering Co., Ltd.) of 5 g, whose average particle diameter was 2 μm, were added to the added solution, and this mixture was stirred to disperse the crosslinked polystyrene particles with a high speed stirrer for an hour. The mixing speed thereof was 5000 rpm. Thereafter, the filtration of the dispersed solution was made with a polypropylene filter having pores whose diameter each was 30 μm. Then the coating solution B for antiglare layer was obtained.

(Preparation of Coating Solution C for Antiglare Layer)

In order to prepare a coating solution C for an antiglare layer, Methylethyl ketone and cyclohexanone were mixed in ratio of 54 wt. % and 46 wt. % for using as the solvent. Further, a mixture (DPHA, produced by NIPPON KAYAKU CO., LTD.) was used, in which dipentaerythlitol pentaacrylate and dipentaerythlitol hexaacrylate were mixed. The solvent of 52 g was supplied with the mixture of 91 g, a solution for hard coat (DeSolite KZ-7115, produced by JSR corporation) of 19 g that contained zirconium oxide, and a solution for hard coat (DeSolite KZ-7161, produced by JSR corporation) of 19 g that contained zirconium oxide. Thus the mixture was dissolved to obtain a mixed solution. Then in the mixed solution was dissolved a photopolymerizable composition (IRGACURE 907, produced by Ciba Geigy Japan Limited) of 10 g to obtain an added solution. The added solution was cast and thereafter solidified in ultraviolet ray to obtain a coating, which had reflective index of 1.61.

Further, crosslinked polystyrene particles (name of product: SX-200H, produced by Soken Chemical & Engineering Co., Ltd.) of 20 g, whose average particle diameter was 2 μm, were added to a mixture solvent of 80 g, in which methylethylketone of 54 wt. % and cyclohexanone of 46 wt. % were mixed. This solution was stirred to disperse the crosslinked polystyrene particles with high speed stirrer of 5000 rpm for an hour, and added to the added solution to obtain the dispersed solution. Thereafter, the filtration of the dispersed solution was made with a polyplopyrene filter having pores whose diameter each was 30 μm. Then the coating solution C for antiglare layer was obtained.

(Preparation of Coating Solution D for Hard Coating)

In order to prepare a coating solution D for a hard coating, Methylethylketone of 62 g and cyclohexanone of 88 g were mixed for using as the solvent. Then, ultraviolet curing hard coat composition (DeSolite KZ-7689, 72 wt. %, produced by JSR corporation) of 250 g was dissolved to the solvent. This obtained solution was cast and solidified in ultraviolet ray to form a coating, which had reflective index of 1.53. Further, the solution was filtrated with a polypropyrene filter having pores whose diameter each was 30 μm. Then the coating solution D for hard coating was obtained.

(Preparation of Coating Solution E for Low Reflective Index Layer)

MEK-ST of 8 g (average diameter of particles was 10 nm-20 nm, $SiO_2$ sol dispersion of methylethylketone, whose solids content degree was 30 wt. %, produced by Nissan Chemical Industries Co., Ltd.) and methylethylketone of 100 g were added to heat closslinked polymer (TN-049, produced by JSR Corporation) of 20093 g containing fluoride that had refractive index of 1.42. This mixture was stirred and filtrated with a polypropylene filter having pores whose diameter was 1 μm. Thus the coating solution for low reflective index layer was obtained.

A surface of the Sample Film 4 having thickness of 80 μm was coated with the coating solution D by using a bar coater, and thereafter dried at 120° C. Then an ultraviolet ray was applied to the coating layer on the film with air-cooled metal halide lamp of 160 W/cm (produced by Eyegraphics Co., Ltd.). The illuminance was thereby 400 mW/cm², and illumination density was 300 mJ/cm². Thus the coating of the dope was solidified to form the hard coat layer of thickness of 2.5 μm on the film. Further, the coating solution A was applied on the hard coat layer on the film with the bar coater. The coating solution A was dried and solidified in the same conditions as in forming the hard coat layer. Thus the antiglare layer of 1.5 μm was formed. Furthermore, the antiglare layer was coated with the coating solution E for the low reflective index layer, and thereafter the coating solution E was dried at 80° C. Then the cross-linking was performed at 120° C. for ten minutes and to form a low reflective index layer whose thickness was 0.096 μm.

The coating solution B was used for coating the Sample Film 4 instead of the coating solution A, and other conditions were the same to form the antireflection film. Further, the coating solution C was used for coating the Sample Film 4 instead of the coating solution A, and other conditions were the same to form the antireflection film. Furthermore, according to Sample Film 5, three types of the antireflection films were made, in which the coating solution A, B, C were respectively used, and other conditions were the same to form the antireflection film.

(Estimation of Antireflection Film)

Six types of the antireflection films were obtained, in which Sample Film 4 was used in the first three types and Sample Film 5 was used in the second three types. Estimations of the six types of the antireflection films were made for the following points:

(1) Specular Reflectance and Integral Reflectance

According to specular reflectance, a spectrophotometer V-550 (produced by JASCO Corporation) was provided with an adapter ARV-474 to measure the specular reflectivity at an exiting angle of −5° according to the incident light of wavelength in the range of 380 nm to 780 nm at the incident angle of 5°. Then the average of the specular reflectance of the reflection whose wave length was in the range of 450 nm to 650 nm was calculated to evaluate properties of reflection inhibit.

Further, according to integral reflectance, a spectrophotometer V-550 (produced by JASCO Corporation) was provided with an adapter ILV-471 to measure the specular reflectance according to the incident light of wavelength in the range of 380 nm to 780 nm at the incident angle of 5°. Then the average of the specular reflectance of the reflection whose wave length was in the range of 450 nm to 650 nm was calculated to evaluate antireflection properties.

(2) Color Tint

A CIE standard light source D65 illuminated the antireflection film. When the light from the CIE standard light source D65 incident at 50 to the antireflection film reflected on the surface thereof to be a regular reflection. According to the regular reflection were calculated L* number, a* number and b* number in a CIE 1976 L*a*b* space on the base of data of spectrum of the reflection which was observed in measuring the specular reflectance. The L* number, a* number and b* number represents the color tint of the regular reflection.

(3) Haze

A haze meter MODEL 1001 DP, (produced by Nippon Denshoku Industries Co., Ltd.) was used for measurement of haze of the antireflection film.

(4) Pencil Hardness

The evaluations of pencil hardness was made as described in JIS K 5400 and the data thereof was used as a criterion of scratch resistance. After the antireflection film was set in atmosphere with the temperature of 25° C. and the humidity of 60% RH for two hours, the surface of the antireflection film was scratched five times with a 3H test pencil determined in JIS S 6006. Thereby a force of 1 kg was applied to the test pencil. The evaluation of the pencil hardness was:
"E" (Excellent), when no scratch remains on the surface;
"G" (Good), when one or two scratches remained on the surface;
"R" (Reject), when more than three scratches remain on the surface.

(5) Contact Angle

After the antireflection film was set in the atmosphere with the temperature of 25° C. and the humidity of 60% RH for two hours, the contact angle of the water on the antireflection film was measured, and the data thereof was used as a criterion of antistaining, especially indicator of finger printing.

(6) Coefficient of Dynamic Friction

After the antireflection film was set in the atmosphere with the temperature of 25° C. and the relative humidity of 60% for two hours, the coefficient of dynamic friction was measured with a machine for measuring the coefficient of dynamic friction, HEIDON-14, in which a stainless ball of ϕ5 mm was used. Thereby, the speed was set to 60 cm/min, and a force of 10 g was applied on the surface of the antireflection film.

(7) Antiglare Property

A fluorescent light (8000 cd/m²) without louver emitted a light onto the antireflection film and the light reflects. It is examined whether an image of the illumination lamp formed by the reflection was observed. The estimation of antiglare property was:
"E" (Excellent), when no outline of the illumination lamp was observed;
"G" (Good), when the outline was slightly recognized;
"P" (Pass) when the outline was not clear but recognized;
"R" (Reject) when the outline was almost clear.

The results of the estimations of the six types of the antireflection films are shown in Table 1.
SA: Kind of solution for antiglare layer
SR: Specular Reflectance
IR: Integral Reflectance
H: Haze
PH: Pencil Hardness
CA: Contact Angle
DF: Coefficient of Dynamic Friction
AP: Antiglare Property

TABLE 1

| Kind of Sample | SA | SR (%) | IR (%) | Color Tint L*/a*/b* | H (%) | PH | CA | DF | AP |
|---|---|---|---|---|---|---|---|---|---|
| Sample 4 | A | 1.1 | 2.0 | 10/1.9/1.3 | 8 | E | 103° | 0.08 | E |
| Example 5 | B | 1.1 | 2.0 | 9/2.0/−4.0 | 8 | E | 103° | 0.08 | E |
|  | C | 1.1 | 2.0 | 9/1.7/0.2 | 12 | E | 103° | 0.08 | E |
| Sample 5 | A | 1.1 | 2.0 | 10/1.9/1.3 | 8 | E | 103° | 0.08 | E |
| Example 6 | B | 1.1 | 2.0 | 9/2.0/−4.0 | 8 | E | 103° | 0.08 | E |
|  | C | 1.1 | 2.0 | 9/1.7/0.2 | 12 | E | 103° | 0.08 | E |

All of the six types of the antireflection films in which Samples 4 and 5 were used were excellent in physical properties of the antireflection film, such as antiglare properties, color tint, pencil hardness, fingerprinting stain proofness, and coefficient of dynamic friction. Further, a liquid crystal display was produced, in which a reflection film provided with Sample Film 3 was disposed in a front surface. In the liquid crystal display, the external light was not mixed with a light for displaying images on the liquid crystal display. Further, the outline of reflected images of the fluorescent lamp were not remarkable, and the displayed images were clearly perceived. The fingerprint was hardly formed on the liquid crystal display.

Various changes and modifications are possible in the present invention and may be understood to be within the present invention.

What is claimed is:

1. A method of producing a high concentration polymer solution, comprising the steps of:
    dissolving a polymer into a solvent to prepare a low concentration polymer solution; and
    continuously concentrating said low concentration polymer solution to obtain said high concentration polymer solution,
    said concentrating step comprising the steps of:
    continuously feeding said low concentration polymer solution to a concentrating tank;
    evaporating part of said solvent of said low concentration polymer solution as a solvent gas in said concentrating tank;
    condensing said solvent gas to recover as a condensed solvent; and
    continuously drawing out from said concentrating tank said high concentration polymer solution obtained during concentrating in said concentrating tank;
    said method further comprising the steps of:
    measuring the polymer concentration of said high concentration polymer solution drawn out from said concentrating tank; and
    controlling at least one of volume of said low concentration polymer solution for feeding into said concentrating tank, temperature of said low concentration polymer solution for concentrating, and recovering volume of said condensed solvent, so as to adjust the polymer concentration of said high concentration polymer solution.

2. A method as described in claim 1, further comprising steps of:
    measuring a level of said low concentration polymer solution in said concentrating tank;
    controlling at least one of volume of said low concentration polymer solution for feeding said concentrating tank, temperature of said low concentration polymer solution for concentrating, and recovery volume of said condensed solvent, so as to keep the level constant.

3. A method as described in claim 1, further comprising steps of:
    measuring recovery volume of said condensed solvent; and
    controlling at least one of temperature of said low concentration polymer solution for concentrating, volume of said low concentration polymer solution for feeding into said concentrating tank, and temperature for condensing said solvent gas, so as to keep said recovery volume of said condensed solvent constant.

4. A method as described in claim 1, wherein said concentrating tank including:
    a tank main body for temporarily storing said low concentration polymer solution while said low concentration polymer solution is concentrated;
    a roof disposed on said tank main body, an inner surface of said roof forming a condensation surface for condensing said solvent gas and recovering said condensed solvent;
    at least one flash nozzle inserted into said tank main body, said flash nozzle being positioned under a solution surface of said low concentration polymer solution in said tank main body while said low concentration polymer solution is concentrated, said flash nozzle discharging fresh low concentration polymer solution which is supplied into said tank main body; and
    a drain pipe which opens on a bottom of said tank main body, for draining said high concentration polymer solution.

5. A method as described in claim 4, wherein an end of said flash nozzle is bent to said bottom of said tank main body to form an L-shape, and said roof has a circular cone shape.

6. A method as described in claim 4, wherein
    a condensation temperature of said condensation surface is preserved in a range of a predetermined condensation temperature value ±10° C.;
    a flash temperature is preserved in a range of ±10° C. from a predetermined temperature, said flash temperature is a temperature of said fresh low concentration polymer solution to be discharged from said flash nozzle;
    a flash pressure is preserved in a range of a predetermined flash pressure value ±0.05 MPa, said flash pressure is a pressure of said fresh low concentration polymer solution to be discharged from said flash nozzle; and
    a drainage value of draining said high concentration polymer solution through said drain pipe is preserved in a range of a predetermined drainage value ±10%.

7. A method as described in claim 6, wherein said flash temperature is at least boiling point of said solvent at the atmospheric pressure, and said flash pressure is 0.1 MPa higher than a vapor pressure of said solvent at said flash temperature.

8. A method as described in claim 7, wherein an inside diameter of said flash nozzle is at most 10 cm.

9. A method as described in claim 7, wherein said inner pressure of said concentrating tank is maximum of 1.5 MPa.

10. A method as described in claim 9, wherein a temperature of said condensation surface is at least 2° C. lower than a boiling point of said solvent at atmospheric pressure, and a temperature distribution of said condensation surface is maximum of 20° C.

11. A method as described in claim 10, wherein overall heat transfer coefficient of said condensation surface is minimum of 50 W/(m²·K).

12. A method as described in claim 11, wherein a heating means including a heating surface for heating said low concentration polymer solution is provided upstream from said concentrating tank, and the overall heat transfer coefficient of said heating surface is minimum of 50 W/(m²·K).

13. A method as described in claim 12, wherein a passage of said low concentration polymer solution between said heating means and said concentrating tank is formed of at least one of nickel alloy, stainless alloy, and titanium alloy.

14. A method as described in claim 4, wherein when S1 is determined as an area of said solution surface of said low concentration polymer solution in said concentrating tank, and S2 is a area S2 of said condensation surface, then a ratio (S1/S2) satisfies a relation of:

$$0.01 \leq (S1/S2) \leq 5.$$

15. A method as described in claim 4, wherein a pressure in an entrance side of a drain pipe for drawing said high concentration polymer solution is minimum of 1000 Pa.

16. A method as described in claim 4, wherein said condensed solvent is drained from said concentrating tank in effect of gravity or surface tension or with a liquid transporting means.

17. A method as described in claim 4, wherein a production step of said low concentration polymer solution comprises sub-steps of:
stirring said low concentration polymer solution;
increasing a pressure of said low concentration polymer solution; and
heating said low concentration polymer solution.

18. A method as described in claim 17, wherein the production step of said low concentration polymer solution is performed plural times, and when temperature and pressure reach respective predetermined values, then said low concentration polymer solution is fed toward said concentrating tank.

19. A method as described in claim 4, wherein said solvent contains at least one of dichloromethane, methyl acetate, methyl formate, acetone, cyclopentanone, cyclohexanone and dioxolane.

20. A method as described in claim 4, wherein parts in a production line for contacting said condensed solvent or said low concentration polymer solution have surface roughness Ra of maximum of 10 μm.

21. A method as described in claim 20, wherein said production line includes plural concentrating tank.

22. A method as described in claim 5, wherein said roof is inclined such that a contact angle of said condensed solvent on said condensation surface may be less than 60°.

23. A method as described in claim 19, wherein said polymer contains at least one of cellulose acylate, polycarbonate, aramid based polymers, polysulfone and cycloolefin based polymers.

24. A method as described in claim 23, wherein said polymer is cellulose acylate.

25. A method as described in claim 24, wherein, when acetyl value of $6^{th}$ hydroxide groups is represented as A, and the acetyl value of $2^{nd}$ and $3^{rd}$ hydroxide groups are represented as B, then said cellulose acylate satisfies following two formulae:

$$2.5 \leq A+B \leq 3.0 \tag{1}$$

$$0.7 \leq A \leq 1.0 \tag{2}$$

wherein the $2^{nd}$, $3^{rd}$, and $6^{th}$ hydroxide groups mean the hydroxide groups at the $2^{nd}$, $3^{rd}$, and $6^{th}$ positions in glucose.

26. A method as described in claim 24, wherein said high concentration polymer solution is cast on a substrate to form a polymer film.

27. A method as described in claim 26, wherein said high concentration polymer solution is cast in a co-casting method to form at least one layer of said polymer film.

28. A method as described in claim 26, wherein said high concentration polymer solution is cast in a sequentially casting method to form at least one layer of said polymer film.

29. A method as described in claim 26, wherein a number of a light point defect having a size of minimum of 20 μm is observed maximum of 200 in an area of 1 cm² of said polymer film sandwiched between cross-nicol polarized films.

30. A method as described in claim 26, wherein said polymer film is used as a protective film for a polarizing filter.

31. A method as described in claim 26, wherein said polymer film is used for optical function film.

\* \* \* \* \*